(12) United States Patent
Haginoya et al.

(10) Patent No.: US 6,862,032 B2
(45) Date of Patent: Mar. 1, 2005

(54) ELECTROPHOTOGRAPHIC APPARATUS

(75) Inventors: Yoshiaki Haginoya, Iwatsuki (JP); Katsuyuki Yanagisawa, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/682,967

(22) Filed: Oct. 14, 2003

(65) Prior Publication Data

US 2004/0183884 A1 Sep. 23, 2004

(30) Foreign Application Priority Data

Mar. 20, 2003 (JP) .................................... 2003-078968

(51) Int. Cl.[7] .............................................. B41J 2/385
(52) U.S. Cl. ................................... 347/129; 347/138
(58) Field of Search ................................ 347/129, 134, 347/137, 138, 257, 258, 260; 250/522.1; 359/198, 215

(56) References Cited

U.S. PATENT DOCUMENTS

| 5,872,367 A | * | 2/1999 | Wolber et al. | ........... 250/522.1 |
| 5,889,606 A | * | 3/1999 | Toyoda | ........................ 359/215 |
| 6,285,390 B1 | * | 9/2001 | Blake | ........................ 347/260 |
| 6,411,325 B1 | * | 6/2002 | Matsushita et al. | ......... 347/257 |

FOREIGN PATENT DOCUMENTS

| JP | 3-39753 U | 4/1991 |
| JP | 5-103164 | 4/1993 |
| JP | 10-213768 | 8/1998 |
| JP | 11-187224 | 7/1999 |

* cited by examiner

Primary Examiner—Eugene H. Eickholt
(74) Attorney, Agent, or Firm—Morgan Lewis & Bockius LLP

(57) ABSTRACT

An electrophotographic apparatus achieves miniaturization thereof and improvement of image quality. The shape of an optical scanning device mount frame mounting an optical scanning device is trapezoidal, and asymmetrical with respect to a center line thereof, and a short side part and a long side part are attached to a first and second frames of the apparatus, respectively. A space for attaching parts is available on the side of the first frame, and a driving device is placed inside the first frame so that the apparatus can be miniaturized. Since the optical scanning device mount frame is asymmetrical with respect to the center line thereof, as compared with one having a symmetrical shape, an eigenvalue of vibration can be shifted to a high frequency, and the mount frame is resistant to vibrate. Thus, the fluctuation of a light beam is suppressed, and the image quality can be improved.

8 Claims, 36 Drawing Sheets

LARGE DEFORMATION

SMALL DEFORMATION

16Z

ELECTROPHOTOGRAPHIC APPARATUS

BACKGROUND OF THE INVENTION

1. Field of the Invention

The present invention relates to an electrophotographic apparatus, such as a laser printer or a digital copying machine, in which an image is recorded by scanning and exposing a light beam onto a body to be scanned in accordance with image information.

2. Description of the Related Art

A structure of an optical scanning device 101 of a conventional electrophotographic apparatus 100 will be described with reference to FIGS. 32A and 32B and FIGS. 33A and 33B.

The optical scanning device 101 is constituted by a light source 106 for emitting a light beam L containing information, a polygon mirror 124A for deflecting the light beam L emitted from the light source 106 toward a specified direction, an imaging lens system 122 for imaging an image of the light beam L on a body 108 to be scanned such as a photosensitive drum, an optical box 109 housing the respective parts, and the like. Incidentally, the optical box 109 is provided with a window part 104 through which the light beam L passes.

The optical box 109 is closed by a cover 110 and is fixed to an optical scanning device mount frame 102 of the electrophotographic apparatus 100 by screws 107.

Further, tongue parts 105 of the optical scanning device mount frame 102 are inserted in not-shown side frames of the electrophotographic apparatus, and the optical scanning device mount frame 102 is positioned and fixed to the side frames with high accuracy.

The electrophotographic apparatus 100 causes the light beam L containing the information to main-scan the body 108 to be scanned so that an electrostatic latent image of the information is formed.

The electrophotographic apparatus 100 is constituted by a not-shown charging unit which uniformly charges the body 108 to be scanned, a developing unit which forms a toner image after the electrostatic latent image is formed by exposure from the main-scanning of the light beam L, a paper handling unit which synchronizes with the toner image and conveys a recording paper, a fixing unit, a frame for housing the respective units, and the like. The frame is generally formed such that two side frames are made to face each other, the optical scanning device mount frame 102 is supported at both ends and is fixed like a bridge, and a driving device for driving the body 108 to be scanned and the like is fixed to the side frames.

The conventional electrophotographic apparatus 100 has a problem that the vibration of the internal paper handling unit and the not-shown driving device for driving the body 108 to be scanned is transmitted to the optical scanning device mount frame 102 to vibrate the optical scanning device 101, so that deviation from a normal laser light path occurs to cause a scanning line deviation, and image quality becomes poor. Thus, as shown in FIG. 32B which is a view of FIG. 32A viewed in a direction of an arrow Y, a support part of the optical scanning device 101 is placed apart from a bent part 103 of the rectangular optical scanning device mount frame 102 facing the body 108 to be scanned by a predetermined value in view of the relation of $S1 \approx S2$. Accordingly, as shown in FIG. 32B, even if the optical scanning device mount frame 102 is vibrated, a change amount $\delta$ of the light beam L with respect to the body 108 to be scanned is very small. This is introduced in, for example, patent document 1 (JP-A-5-103164).

In an electrophotographic apparatus 120 of another example shown in FIGS. 34A to 34C, an optical scanning device 121 is of a type including a reflecting mirror 127, and a mount frame supported by an electrophotographic apparatus frame 133 is divided into an optical scanning device mount frame 129 and a reflecting mirror mount frame 130.

Incidentally, in FIGS. 34A to 34C, reference numeral 122 denotes an imaging lens system; 123, a light source; 124A, a polygon mirror; 124, a motor for rotating the polygon mirror; 125, an optical box; 126, a window part; 127, a reflecting mirror; 128, an attachment part; 129, an optical scanning device mount frame; 130, a reflecting mirror mount frame; 131, tongue parts; 132, attachment holes in which the tongue parts 131 are inserted; and 133, an electrophotographic apparatus frame.

By adopting the structure as stated above, since vibration of the motor 124 is not easily transmitted to the reflecting mirror 127, the improvement of image quality is achieved, and this is introduced in, for example, patent document 2 (JP-UM-A-3-39753).

Further, in an electrophotographic apparatus 140 of another example shown in FIGS. 35A and 35B, an optical scanning device 141 is provided with support parts 148 at four corners of an optical box 145, and is fastened to an optical scanning device mount frame 149 by only one screw 153 at a substantially center position of the four support parts.

Incidentally, in FIGS. 35A and 35B, reference numeral 142 denotes an imaging lens system; 143, a light source; 144, a motor for rotating a polygon mirror; 146, a window part; 147, a cylinder lens; 150, a boss; 151, a synchronous light reflecting mirror; 152, a synchronous light detection unit; and 154, a body to be scanned.

That is, even if a bottom plate of the optical box 145 is warped, it is forcibly pressed to the optical scanning device mount frame 149, and vibration is suppressed by fixing the bottom plate of the optical box 145 which is apt to vibrate, so that the improvement in the image quality can be achieved, and this is introduced in, for example, patent document 3 (JP-A-10-213768).

Besides, in an optical scanning device 160 of an electrophotographic apparatus of another example shown in FIGS. 36A and 36B, a reflecting mirror 161 is pressed by elastic bodies 165A, and a reflection plane 162 is pressed to support parts 164A, 164B and 164C of support bodies 163A and 163B.

Further, in the support body 163A for supporting the reflection plane 162 at one point of the support part 164A, support parts 164D and 164E separated from the reflection plane 162 by a clearance X are provided at both sides of the support part 164A, and an adhesive (not shown) is applied to the support parts 164D and 164E and the reflection plane 162.

By this, it is possible to prevent rotational vibration in directions of arrows E and F shown in FIG. 36D in the case where the reflecting mirror 161 is supported by three points of 164A, 164B and 164C of support bodies 163A and 163B as shown in FIG. 36C, and this is introduced in, for example, patent document 4 (JP-A-11-187224).

Incidentally, in many cases, a beam of an optical source of an optical scanning device is incident on a plane obliquely with respect to a motor.

Besides, fixing of the periphery of the light source must be devised so that a light source portion is not easily subjected to the influence of vibration.

In the electrophotographic apparatus 100 of FIGS. 32A and 32B and FIGS. 33A and 33B (JP-A-5-103164), as shown in FIG. 33A, the optical box 109 is fixed to the optical scanning device mount frame 102 by the screws 107 at the four positions apart from the bent parts 103 by S1 and S2, and since a portion of the optical box 109 close to a position Ea surrounded by a circle is fixed by the screw 107 at the position apart from the bent part 103 by S2, there is no problem. However, since a portion of the optical box 109 close to a position Eb surrounded by a circle (close to the light source 106), in which the respective optical parts are housed, must be formed firmly, it is necessary to enlarge the size of the periphery of the optical box 109 close to the position Eb.

Thus, a harmful influence is exerted on the miniaturization of the electrophotographic apparatus 100.

For example, although the portion close to the position Eb apart from the bent part 103 by S3 has only to be fixed by the screw 107, since the position Eb is near to the antinode of vibration shown in FIG. 33B, the light source portion is fluctuated by the vibration, the light path is deviated to L', and an influence is exerted on the image quality.

Besides, in the electrophotographic apparatus of FIGS. 34A and 34B (JP-UM-A-3-39753), as shown in FIG. 34B, with respect to the fixing of the optical scanning device mount frame, it is fixed at two points on one side and at one point on the other side with respect to the center of the frame in the scanning direction. However, when attention is paid to a region Ec close to the light source, since the frame on the light source side and on the one point fixing side is vibrated as shown in FIG. 34C, the light beam L is deviated like L', and an influence is exerted on the image quality.

Further, in the electrophotographic apparatus of FIGS. 35A and 35B (JP-A-10-213768), since the portion close to the center of the optical scanning device 141, which becomes the antinode, is fixed, it must be made firm so that the optical scanning device mount frame 149 does not vibrate, and therefore, the weight of the electrophotographic apparatus is increased and the cost is raised.

Besides, in the optical scanning device mount frame as shown in FIGS. 32A and 32B and FIGS. 33A and 33B (JP-A-5-103164), since the maximum deformation part at the time of vibration exists at the substantially center part of the optical scanning device mount frame, the technique of the optical scanning device of FIGS. 35A and 35B (JP-A-10-213768) can not be applied.

Besides, in the example of FIGS. 36A and 36B (JP-A-11-187224), since the adhesive is applied to the support parts of the reflecting mirror (reflection plane in the vicinity of the scanning region), it is necessary to take care not to erroneously apply the adhesive to the scanning region, and the application operation has been difficult.

SUMMARY OF THE INVENTION

The present invention has been made in view of the above circumstances and provides an electrophotographic apparatus which achieves the miniaturization of the electrophotographic apparatus and the improvement of image quality.

According to an aspect of the present invention, the electrophotographic apparatus includes an optical scanning device in which at least a light source for emitting a light beam, a polygon mirror for scanning the light beam, a motor for rotating the polygon mirror, and an imaging optical system for imaging an image of the light beam on a body to be scanned are housed in an optical box, an optical scanning device mount frame which mounts the optical scanning device, and at least one pair of side frames to which the optical scanning device mount frame is attached, wherein at least both ends of the optical scanning device mount frame having a center line of the optical scanning device mount frame as a center are attached to the side frames, and a shape of the optical scanning device mount frame is an asymmetrical shape with respect to the frame center line of the optical scanning device mount frame.

Next, the operation of the electrophotographic apparatus of the invention will be described.

In the electrophotographic apparatus of the invention, the shape of the optical scanning device mount frame which mounts the optical scanning device in which at least the light source for emitting the light beam, the polygon mirror for scanning the light beam, the motor for rotating the polygon mirror, and the imaging optical system for imaging the image of the light beam on the body to be scanned are housed in the optical box, is asymmetrical with respect to the center line of the optical scanning device mount frame.

Here, the asymmetrical optical scanning device mount frame can be formed by removing a portion of a conventional rectangular optical scanning device mount frame, and by this, between at least the one pair of side frames, it becomes possible to provide a space for disposition of parts on one side of the optical scanning device mount frame.

Accordingly, it becomes possible to move a part of or all of other devices disposed outside of the side frame to the space provided between the pair of side frames, so that the size of the electrophotographic apparatus can be made small, and the weight can be reduced.

Besides, with respect to the optical scanning device mount frame which mounts the optical scanning device, when a symmetrical one with respect to the frame center line is compared with an asymmetrical one, an eigenvalue of vibration of the asymmetrical one can be shifted to a high frequency, and the optical scanning device mount frame can be made difficult to vibrate.

Accordingly, the improvement of image quality can be achieved.

BRIEF DESCRIPTION OF THE DRAWINGS

Preferred embodiments of the present invention will be described in detail based on the following figures, wherein:

FIGS. 36A to 36D are explanatory views of a reflecting mirror support part in the inside of an optical scanning device of another conventional electrophotographic apparatus, in which FIG. 36B is a view of FIG. 36A viewed in a direction of an arrow A, and FIG. 36D is a view of FIG. 36C viewed in a direction of an arrow A.

DETAILED DESCRIPTION OF THE INVENTION

[First Embodiment]

Figure 1:
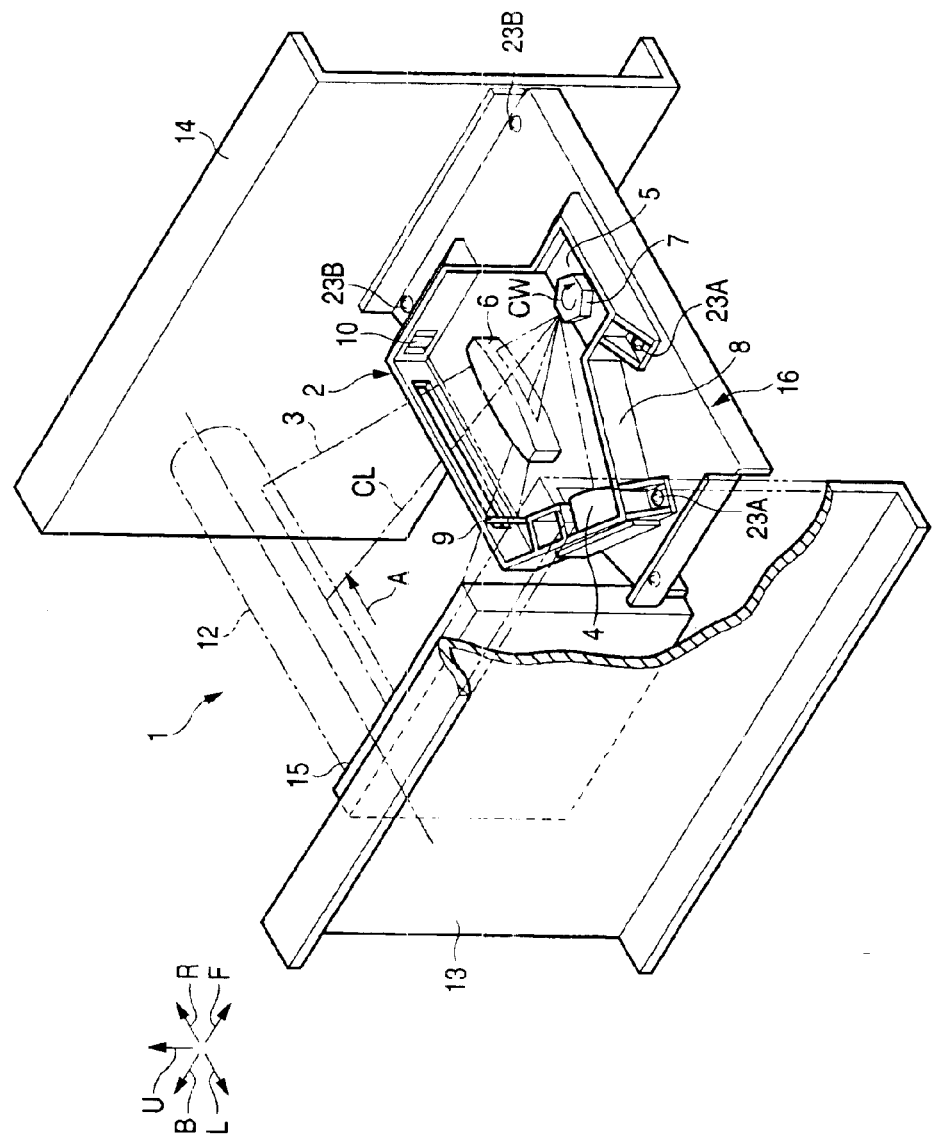
FIG. 1 is a perspective view showing the main part of an electrophotographic apparatus of a first embodiment.

An electrophotographic apparatus of the present invention includes an optical scanning device in which at least a light source for emitting a light beam, a polygon mirror for scanning the light beam, a motor for rotating the polygon mirror, and an imaging optical system for imaging an image of the light beam on a body to be scanned are housed in an optical box, an optical scanning device mount frame which mounts the optical scanning device, and at least one pair of side frames to which the optical scanning device mount frame is attached, wherein at least both ends of the optical scanning device mount frame having the center line of the optical scanning device mount frame as the center are attached to the side frames, and the shape of the optical scanning device mount frame is an asymmetrical shape with respect to the frame center line of the optical scanning device mount frame.

In the electrophotographic apparatus of the invention, it is preferable that the optical scanning device mount frame is formed to have such a shape that the maximum deformation position on an optical scanning device mount plane at the time of vibration becomes a position different frame the center line.

In the conventional rectangular optical scanning device mount frame, the maximum deformation position is located in the vicinity of the frame center line position. However, when the shape of the optical scanning device mount frame is made such that the maximum deformation position on the optical scanning device mount plane at the time of vibration becomes the position different from the frame center line, the maximum deformation position is shifted from the frame center line position toward the end direction (direction orthogonal to the frame center line).

Thus, parts in the inside of the optical scanning device, which receive vibration and have a relatively great influence on the image quality, are disposed apart from the maximum deformation position, so that an image of high image quality can be obtained.

In the electrophotographic apparatus of the invention, it is preferable that the lengths of coupling parts of the optical scanning device mount frame connected with the respective side frames are different from each other, the optical box has plural fixing points for fixing to the optical scanning device mount frame, and the fixing points on the side of the short coupling part with reference to the frame center line are placed more than the fixing points on the side of the long coupling part.

As stated above, in the case where the lengths of the coupling parts connected with the side frames are made different from each other, the maximum deformation position of the optical scanning device mount frame is shifted to the side of the long coupling part. Accordingly, the optical scanning device mount frame on the side of the short coupling part becomes difficult to vibrate.

Further, in the optical box, when the fixing points on the side of the short coupling part of the optical scanning device mount frame are placed more than the fixing points on the side of the long coupling part, the optical scanning device mount frame on the side of the short coupling part becomes further difficult to vibrate.

Accordingly, parts in the inside of the optical scanning device, which receive the vibration of and have a relatively great influence on the image quality, are concentrically disposed on the side of the short side, so that the further improvement of the image quality can be achieved.

In the electrophotographic apparatus of the invention, and in the optical box, it is preferable that the fixing point of at least one place is provided inside the other fixing points of at least four places, and the inside fixing point is disposed on the side of the short side of the optical scanning device mount frame with respect to the frame center line.

In the electrophotographic apparatus, when the fixing point of at least one place is provided inside the other fixing points of at least four places, and the inside fixing point is disposed on the side of the short side of the optical scanning device mount frame with respect to the center line of the optical scanning device mount frame, an easily swingable antinode portion of the optical box can be positively fixed to the portion of the optical scanning device mount frame which is difficult to vibrate, and the eigenvalue of the vibration of the optical box can be shifted to a high frequency. Thus, the optical box can be made difficult to vibrate, and the improvement of image quality can be achieved.

In the electrophotographic apparatus of the invention, it is preferable that a part of or all of at least a driving device for driving the body to be scanned is placed inside the pair of side frames and in the vicinity of the coupling portion having the short coupling length among the coupling portions between the side frames and the optical scanning device mount frame.

The part of or all of the driving device, which has been conventionally disposed on the outside portion of the electrophotographic apparatus, is placed in a space inside the pair of side frames and in the vicinity of the coupling portion having the short coupling length among the coupling portions between the side frames and the optical scanning device mount frame, so that the size of the electrophotographic apparatus can be made small.

The driving device is for driving at least the body to be scanned, and may be for driving other mechanisms of the electrophotographic apparatus, for example, a paper handling mechanism and the like.

In the electrophotographic apparatus of the invention, it is preferable that the light source is placed on the side of the short side of the optical scanning device mount frame with respect to the frame center line.

The light source of the optical scanning device is disposed on the side of the short side of the optical scanning device mount frame with respect to the frame center line, that is, the light source susceptible to the influence of the vibration is disposed on the side where the fluctuation of the optical scanning device mount frame is small, so that the improvement of image quality can be achieved.

In the electrophotographic apparatus of the invention, it is preferable that the short side of the optical scanning device mount frame is disposed at a latent image writing start side.

In the optical scanning device, the synchronous light detection device for detecting the synchronous light, and the synchronous light reflecting mirror for reflecting the light beam reflected by the polygon mirror to a synchronization detection device are disposed at the latent image writing start side. The short side of the optical scanning device mount frame is disposed at the latent image writing start side, so that the synchronous light detection device susceptible to the influence of the vibration and the synchronous light reflecting mirror are disposed on the side of a small fluctuation, and the improvement of image quality at the latent image writing start side can be achieved.

Hereinafter, a more specific first embodiment of an electrophotographic apparatus of the invention will be described in detail with reference to the drawings.

Figure 2A:
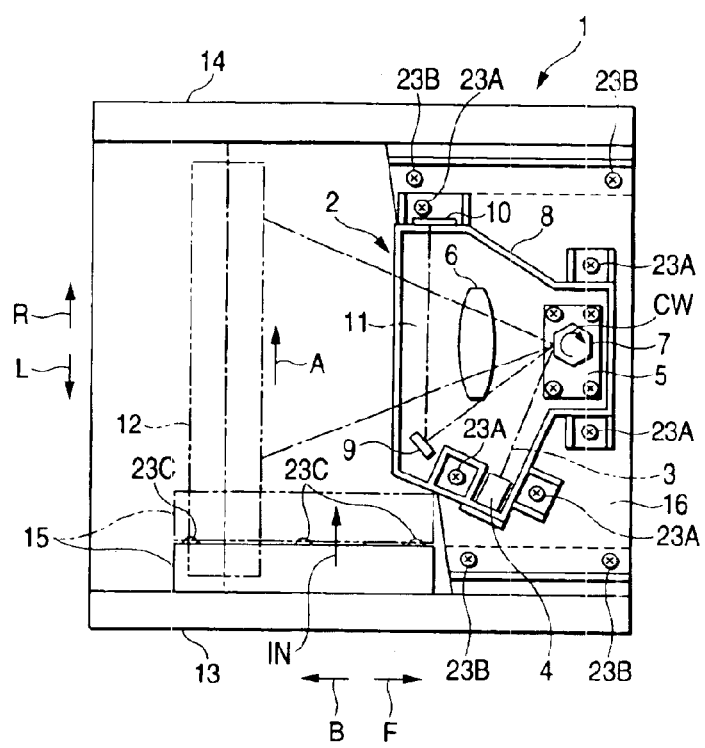
FIG. 2A is a partially sectional view showing a rough structure of the electrophotographic apparatus of the first embodiment when viewed from above.
Figure 2B:
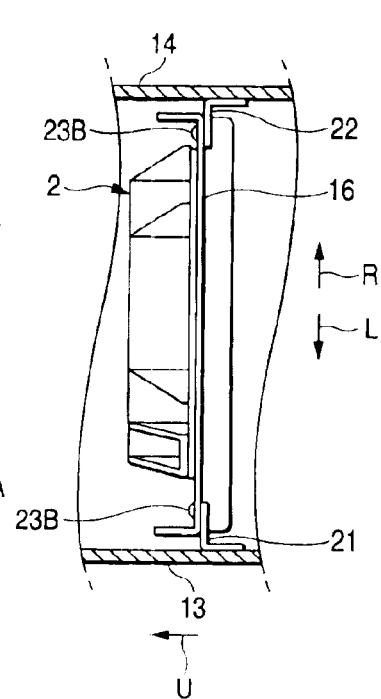
FIG. 2B is a partially sectional view showing the rough structure of the electrophotographic apparatus of the first embodiment when viewed laterally.

As shown in FIG. 1 and FIGS. 2A and 2B, an electrophotographic apparatus 1 includes an optical scanning device 2 for scanning a light beam. Incidentally, an arrow F direction in the drawing indicates an apparatus front side; an arrow B direction, an apparatus back side; an arrow R direction, an apparatus right side; an arrow L direction, an apparatus left side; and an arrow U direction, an apparatus upper side.

The optical scanning device 2 includes a light source 4 for emitting a light beam 3 containing information, a polygon mirror 7 for deflecting the light beam 3 emitted from the light source 4 toward a predetermined direction, a motor 5 for rotating the polygon mirror 7, and an imaging lens system made up of an fθ lens 6 and the like (illustration of other lens systems are omitted).

The light beam 3 emitted from the light source 4 is scanned through the polygon mirror 7 and the imaging lens system in an axial direction on a body 12 to be scanned.

The polygon mirror 7 rotates in an arrow CW direction (clockwise direction), and scans the body 12 to be scanned in an arrow A direction.

Here, the light beam 3 before irradiation on the body 12 to be scanned and after passing through the fθ lens 6 is detected by a synchronous light detection device 10 through a synchronous light reflecting mirror 9, and after being detected by the synchronous light detection device 10, the light beam with a specified delay is scanned and irradiated to the body 12 to be scanned. Incidentally, the light beam 3 reaching the synchronous light detection device 10 is light for determining the writing timing to the body 12 to be scanned, and will be hereinafter referred to as a synchronous light 11 in this embodiment.

The respective optical parts, such as the light source 4, the motor 5, the imaging lens system, the polygon mirror 7, the synchronous light reflecting mirror 9, and the synchronous light detection device 10, are housed in an optical box 8 an upper part of which is opened.

The optical box 8 is closed by a not-shown cover, and is fixed by screws 23A to an optical scanning device mount frame 16 made of sheet metal.

Incidentally, in the optical box 8, portions fixed by the screws 23A become fixing points of the invention.

The electrophotographic apparatus 1 includes a first frame 13 and a second frame 14 which are separated from each other by an interval, stand parallel to each other, and are made of sheet metal.

A first stay 21 made of sheet metal, which has an L-shaped section and has two not-shown convex bosses protruding upward, is attached to the inside surface of the first frame 13, and a second stay 22 made of sheet metal, which has an L-shaped section and has two not-shown bosses protruding upward, is attached to the inside surface of the second frame 14.

Incidentally, the positional relation of the boss, the body 12 to be scanned, the first stay 21, and the second stay 22 is formed with high precision.

Not-shown high precision positioning round holes corresponding to the two bosses and attachment holes 32 in which screws 23B for fixing are inserted are formed in the optical scanning device mount frame 16.

The optical scanning device mount frame 16 is put on the stay 21 and the stay 22 like a bridge, and is fixed to the stay 21 and the stay 22 by the screws 23B passing through the attachment holes 32.

Incidentally, the bosses of the stays are inserted in the round positioning holes of the optical scanning device mount frame 16, so that the positional relation between the optical scanning device mount frame 16 and the body 12 to be scanned is kept.

The electrophotographic apparatus 1 includes a not-shown charging unit for uniformly charging the body 12 to be scanned, a development unit including the body 12 to be scanned which is exposed by main-scanning of the light beam 3, for forming a toner image after an electrostatic latent image is formed, a so-called drum cartridge 28, a paper handling unit 26 for conveying a recording sheet P in synchronization with the toner image, a fixing unit 27 and the like, and these units are placed in such a form that they are supported by the first frame 13 and the second frame 14.

Incidentally, in the electrophotographic apparatus 1, the basic principle for the formation of an image is similar to a conventional general electrophotographic apparatus.

As shown in FIG. 2A, the optical scanning device mount frame 16 of this embodiment has an asymmetrical shape with respect to the frame center line (in this embodiment, a trapezoid with sides each having a linear shape), and the mount frame on the side of the first frame 13 is formed to be shorter than that on the side of the second frame 14. Thus, when the inside of the first frame 13 is compared with the inside of the second frame 14, it is understood that a larger space is secured in the inside of the first frame 13 than the inside of the second frame 14.

In this embodiment, the development unit, the paper handling unit 26, a driving motor for driving the fixing unit 27 and the like, and a driving device 15 including a gear train and the like are attached by screws 23C to the inside of the first frame 13 of the optical scanning device mount frame 16 on the side of the body 12 to be scanned.

For maintenance or the like, the driving device 15 can be taken off toward the inside the device (direction of an arrow IN of FIG. 2A) by removing the screws 23C.

Figure 5A:
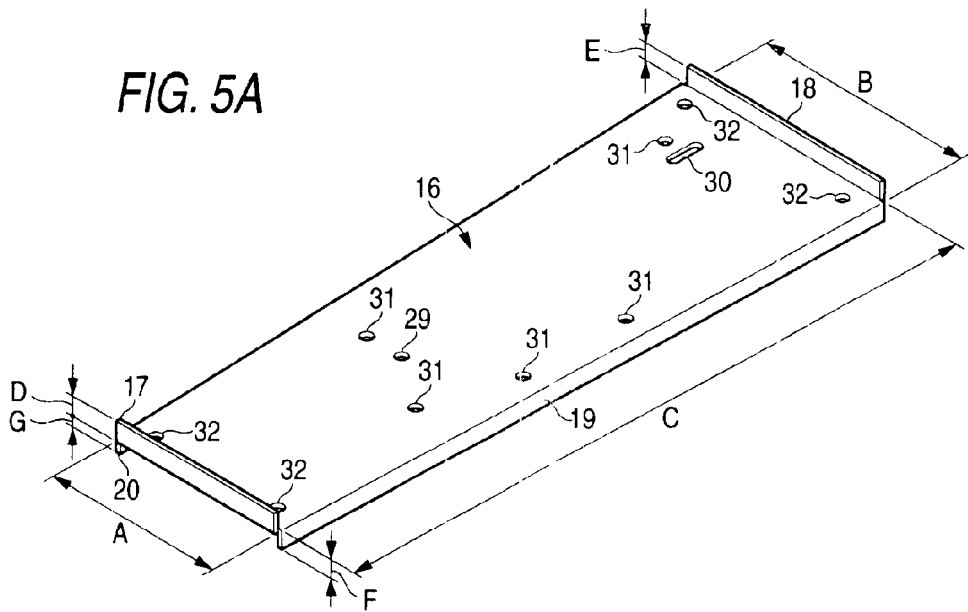
FIGS. 5A and 5B are views of an optical scanning device mount frame of FIG. 1.
Figure 5B:
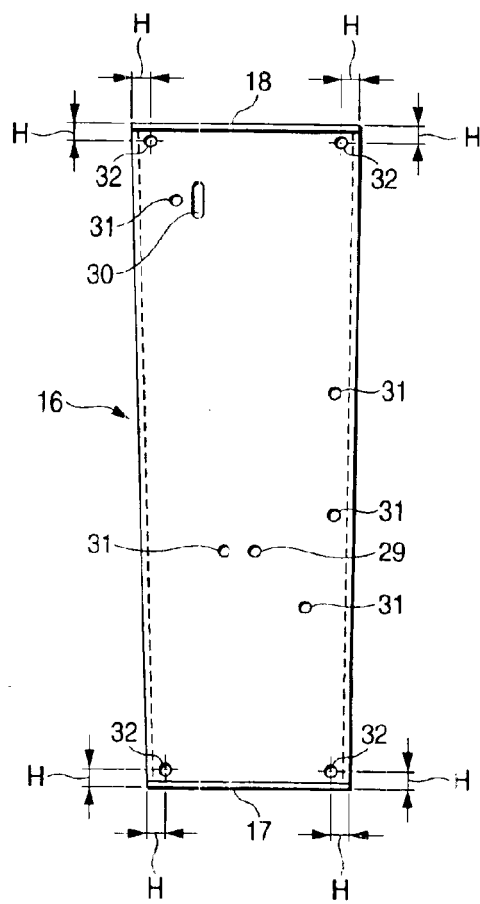

Here, positioning of the optical scanning device 2 and the optical scanning device mount frame 16 will be described with reference to FIGS. 5A and 5B.

In the optical scanning device mount frame 16, a round hole 29 and a long hole 30 are formed with high accuracy from the not-shown positioning round hole, and not-shown bosses formed on the bottom (not shown in FIG. 5) of the optical box 8 are inserted in the round hole 29 and the long hole 30, so that the positional relation between the optical scanning device 2 and the body 12 to be scanned is kept with high accuracy.

In this embodiment, the material of the optical scanning device mount frame 16 is steel, a first bent part 17 of an end on the side of the first frame 13 and a second bent part 18 of an end on the side of the second frame 14 are respectively bent upward, and a third bent part 20 on the side of the body 12 to be scanned and a fourth bent part 19 on the opposite side to the side of the body 12 to be scanned are respectively bent downward.

In this embodiment, A (length of the first bent part 17): 110 mm, B (length of the second bent part 18): 125 mm, C (length of the fourth bent part 19): 370 mm, D to G (bent widths): 15 mm, and H (distance between the end and the hole center): 10 mm.

The optical scanning device 2 is fixed at three points on the side of the short side of the optical scanning device mount frame 16 with respect to the frame center line, and is fixed at two points on the side of the long side.

More specifically, the optical scanning device is fixed at two points close to the light source 4 (one point is close to the third bent part 20 and is close to the synchronous light reflecting mirror 9), at one point close to the synchronous light detection device 10 and close to the third bent part 20, and at two points close to both sides of the motor 5 and close to the fourth bent part 19.

(Operation)

In the electrophotographic apparatus 1 of this embodiment, the length of the optical scanning device mount frame 16 on the side of the first frame 13 is made shorter than that on the side of the second frame 14, so that the space where parts are attached comes into existence on the side of the first frame 13 of the optical scanning device mount frame.

Figure 8:
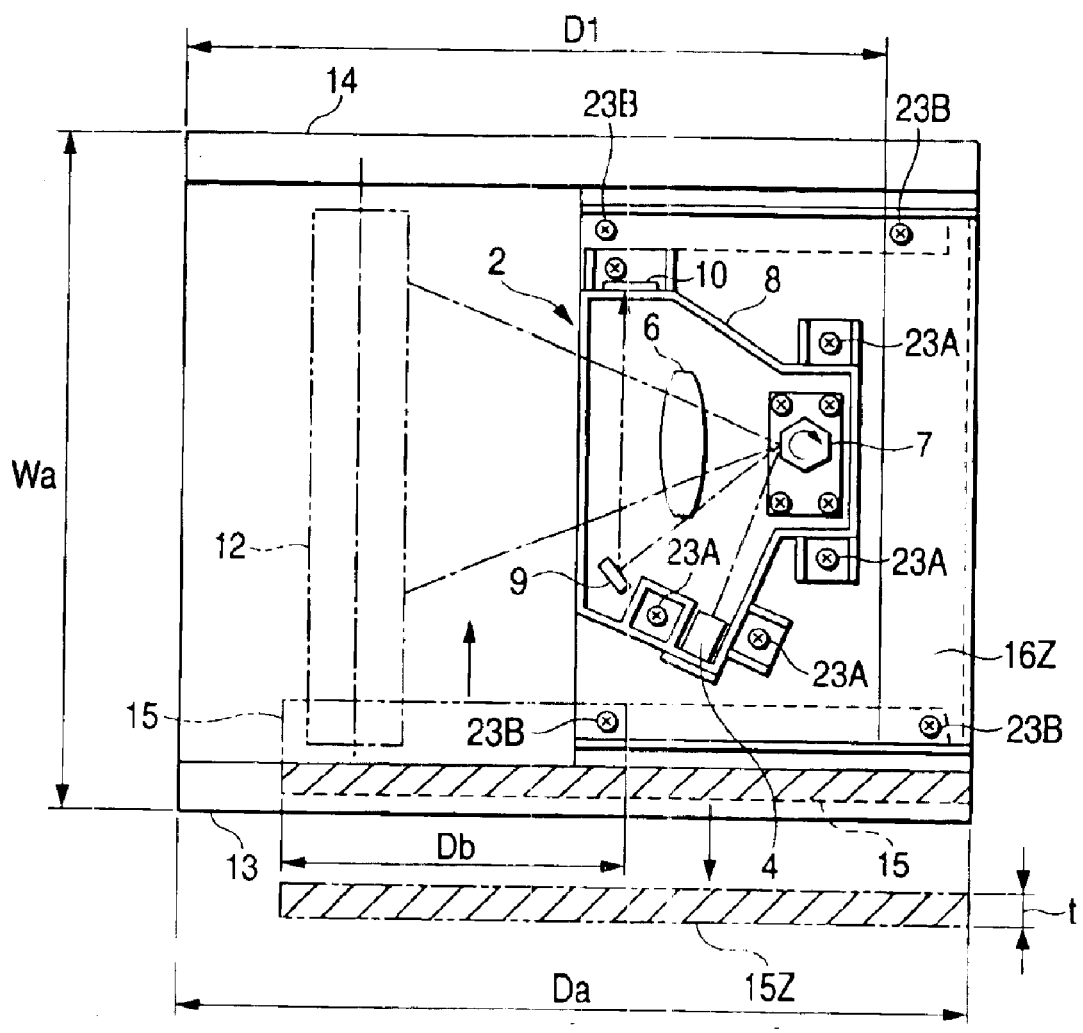
FIG. 8 is a view for explaining problems in a case where the conventional optical scanning device mount frame is applied.

As shown in FIG. 8, although a driving device 15z requiring maintenance is conventionally placed outside of the first frame 13 of the electrophotographic apparatus, in this embodiment, as described above, since the space comes into existence in the inside the electrophotographic apparatus 1, the driving device 15 can be detachably placed inside the first frame 13 (indicated by a two-dot chain line of FIG. 8).

Thus, the length of the driving device 15 placed outside is reduced to Db which is approximately the half of a conventional length, and the depth Da of the electrophotographic apparatus can be reduced to D1.

Incidentally, even if miniaturization of the electrophotographic apparatus is attempted while the same printing speed is kept, the size of the driving motor of the driving device and gears can not be greatly changed.

Accordingly, although the volume of the driving device 15 is hardly changed as compared with the conventional case, in the driving apparatus 15 of this embodiment, instead of shortening of the depth size, the thickness is increased as compared with the convention case. This is enabled since the space comes into existence in the inside of the first frame 13.

Figure 3A:
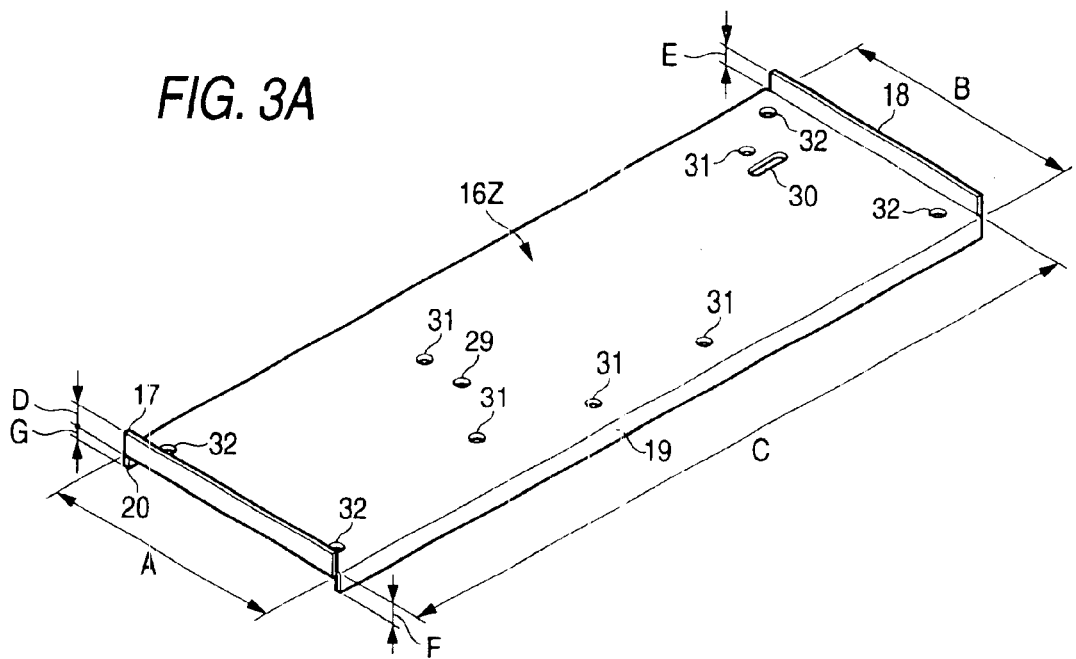
FIG. 3 is a view of an example in which a conventional optical scanning device mount frame is applied.
Figure 3B:
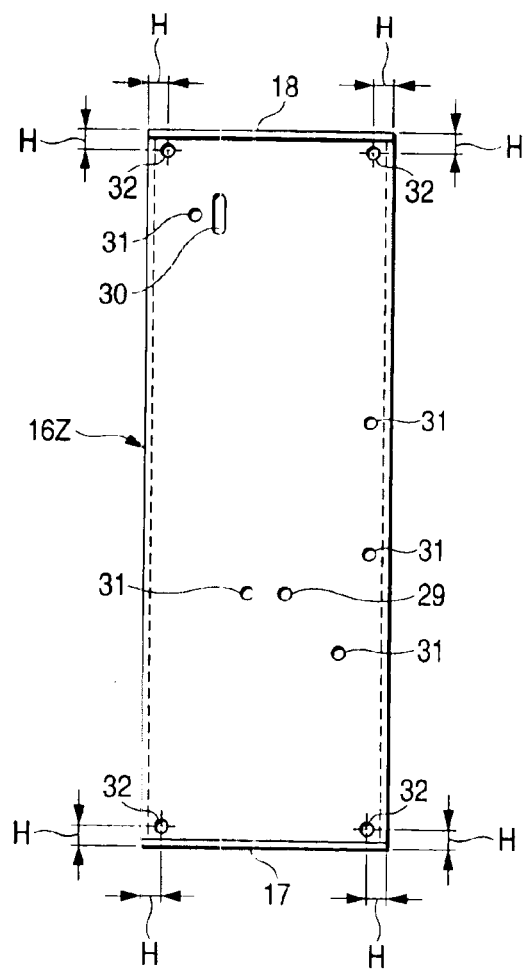

FIG. 3 shows an optical scanning device mount frame 16z as a conventional example, which is formed to have a rectangle of a symmetrical shape with respect to the center line of the optical scanning device mount frame, the material of which is steel similarly to this embodiment, and the respective sizes of which are as follows: A: 125 mm, B: 125 mm, C: 370 mm, D to G: 15 mm, and H: 10 mm.

Figure 4:
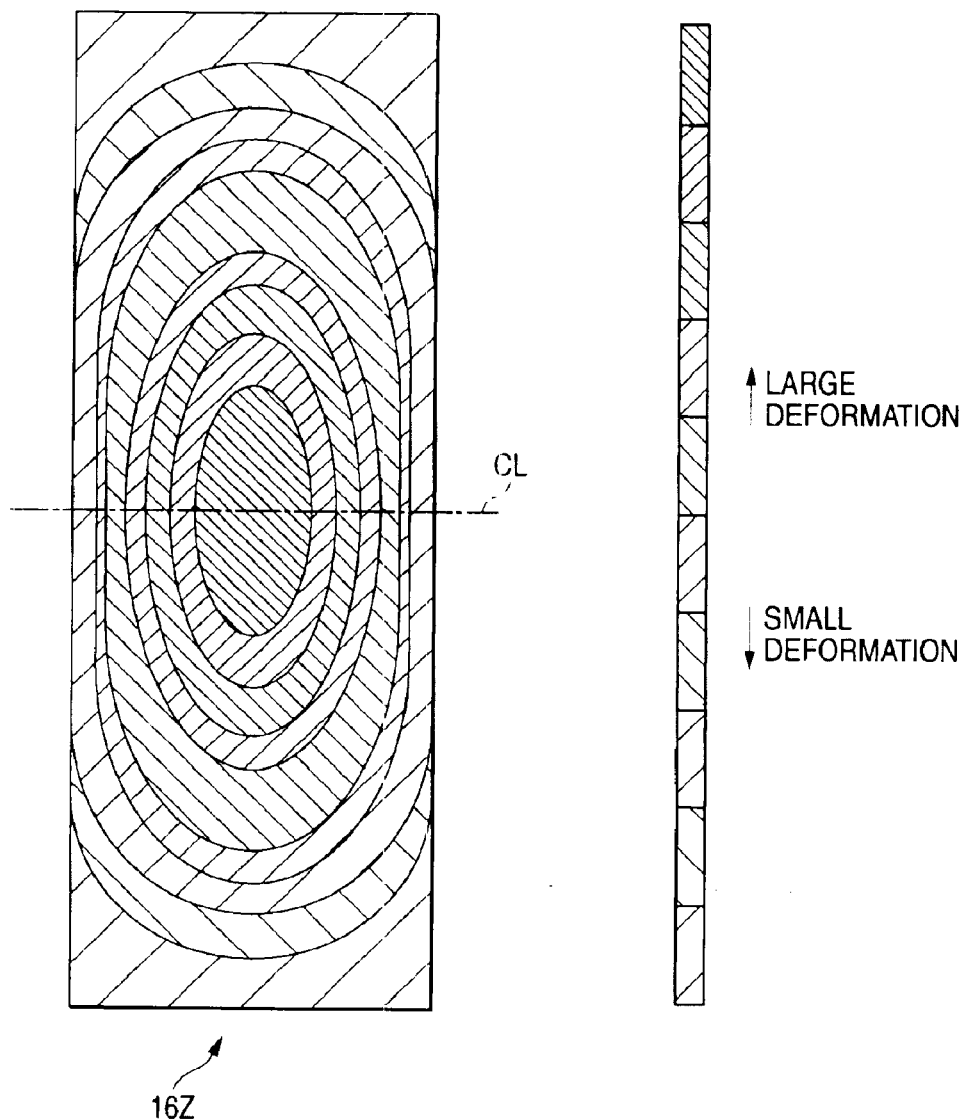
FIG. 4 is a view showing the analysis result of the frame of FIG. 3.
Figure 6:
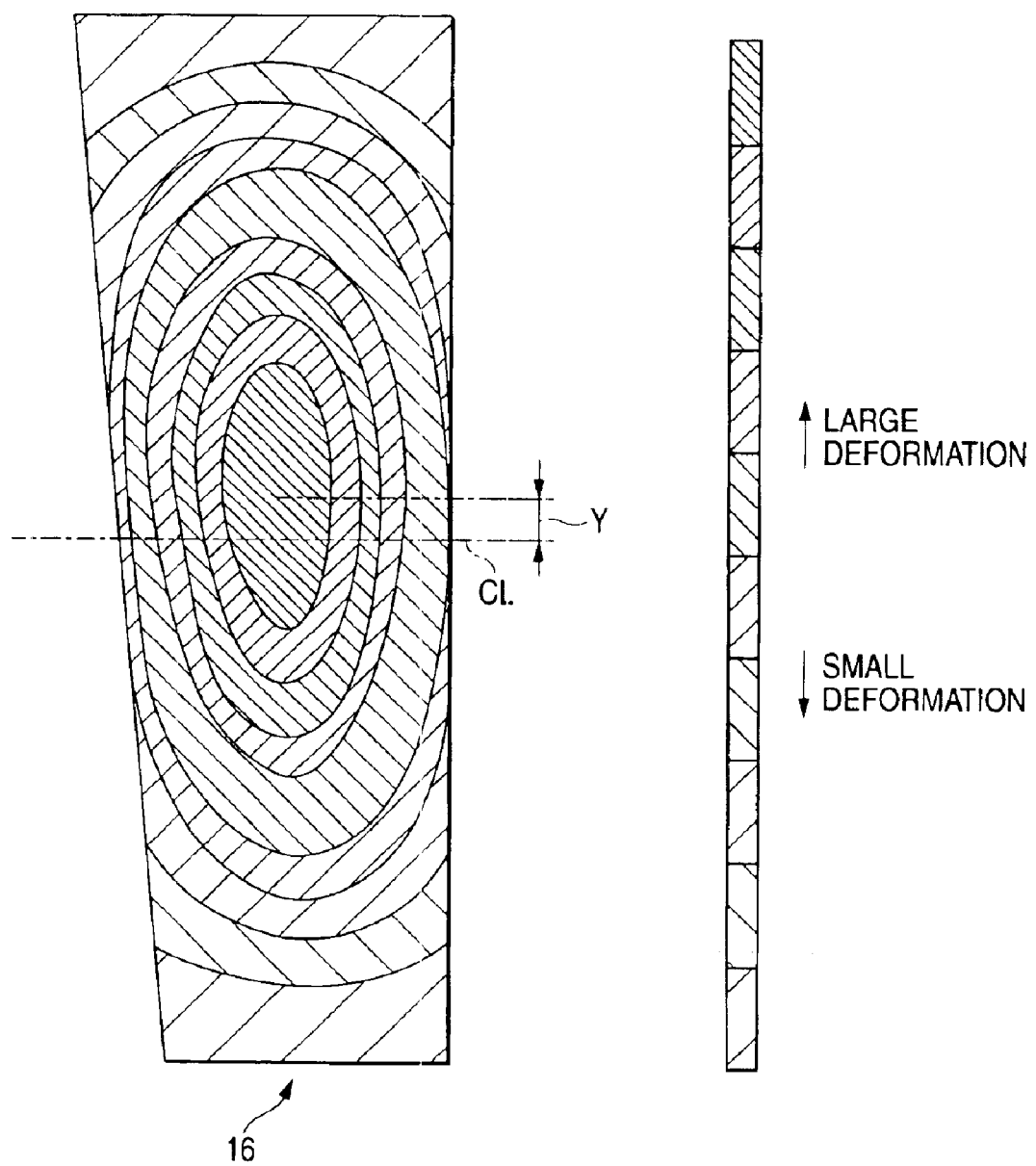
FIG. 6 is a view showing the analysis result of the optical scanning device mount frame of FIG. 5.

FIGS. 4 and 6 show vibration analysis results of the case where the conventional optical scanning device mount frame 16z and the optical scanning device mount frame 16 of this embodiment are fixed to the first frame 13 and the second frame 14 through the four corner attachment holes 32.

Incidentally, in FIGS. 6 and 4, a part where deformation (amplitude) at the time of vibration is largest is a black area, and a part where the deformation is smallest is an area of oblique lines which rise rightward and have large intervals.

In the conventional optical scanning device mount frame 16z, although the eigenvalue of a primary frequency is 155 Hz, in the optical scanning device mount frame 16 of this embodiment, the eigenvalue of a primary frequency is 175 Hz and is shifted to a high frequency.

Accordingly, it is understood that the optical scanning device mount frame 16 of this embodiment is difficult to vibrate as compared with the conventional frame.

Besides, since the size of the optical scanning device mount frame 16 is small as compared with the conventional frame, weight reduction of the apparatus can also be realized.

Besides, as a result of a test, in the optical scanning device mount frame 16 of this embodiment, as shown in FIG. 6, the maximum deformation position on the optical scanning device mount plane is shifted by Y=15.5 mm with respect to the center line CL of the optical scanning device mount frame 16 in the longitudinal direction (in this embodiment, it is coincident with the center line of the optical scanning device mount frame 16 in the light beam scanning direction).

In this embodiment, the optical scanning device 2 is fixed to the optical scanning device mount frame 16 at the three points on the side of the short side with respect to the center line of the optical scanning device mount frame, and at the two points on the side of the long side. More specifically, it is fixed at the two points close to the light source, one of them is close to the synchronous light reflecting mirror 9, the other four points are close to the third bent part 19 and the fourth bent part 20. That is, since the light source 4 susceptible to the influence of vibration is disposed on the side where the deformation of the optical scanning device mount frame 16 is small, the improvement of image quality can be achieved, and similarly, since the synchronous light reflecting mirror 9 for detecting the synchronous light, which is susceptible to the influence of vibration, is disposed on the side where the deformation is small, the improvement of image quality on the latent image writing start side can be achieved.

Incidentally, in this embodiment, although the synchronous light reflecting mirror 9 is provided on the opposite side of the synchronous light detection device 10, the synchronous light reflecting mirror 9 may be removed, and the synchronous light detection device 10 may be directly disposed instead of the removed synchronous light reflecting mirror 9.

Besides, in this embodiment, although the optical scanning device 2 is fixed to the optical scanning device mount frame 16 at the five points as shown in FIG. 2A, when for example, five or more fixing points are provided, and one of them is placed in an area formed of the remaining four points and on the side of the short side of the optical scanning device mount frame 16 with respect to the position of the frame center line, the eigenfrequency of the optical box 8 can be shifted to a higher frequency.

Besides, in this embodiment, although the optical scanning device mount frame 16 is attached to the first frame 13 through the stay 21 and to the second frame 14 through the stay 22, the stays 21 and 22 may be omitted, and the first bent part 17 may be directly fixed to the first frame 13, and the second bent part 18 may be directly fixed to the second frame by screws or welding.

Besides, all of the bent parts of the optical scanning device mount frame 16 may be bent toward the same side.

Besides, in this embodiment, although the materials of the optical scanning device mount frame 16, the first frame 13, the second frame 14, the stay 21, and the stay 22 are respectively steel, a material other than steel, for example, glass fiber plastic may be used.

Figure 7:
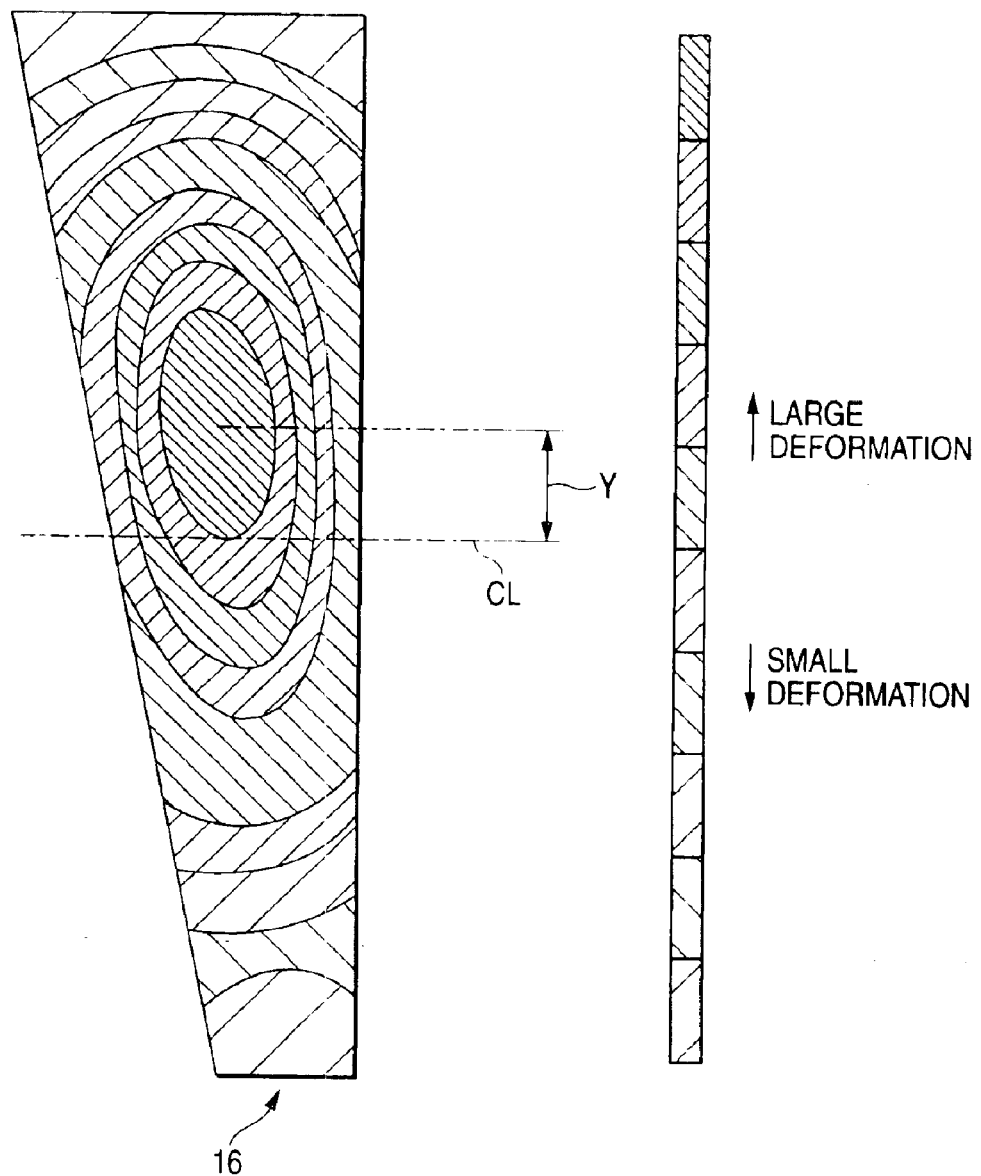
FIG. 7 is a view showing the analysis result of the optical scanning device mount frame of FIGS. 5A and 5B having another size.

FIG. 7 shows the vibration analysis result in which A shown in FIG. 5 is 50 mm, and B is 125 mm.

As a result of the vibration analysis, the primary eigenvalue is 217 Hz and is further shifted to a high frequency.

As shown in FIG. 7, in this embodiment, the maximum deformation position on the optical scanning device mount plane is shifted toward the long side by Y=50.6 mm with respect to the frame center line CL of the optical scanning device mount frame 16.

From the result of the two vibration analyses, when the ratio of the short side in the case where the long side is made 1 with respect to the center line of the optical scanning device mount frame 16, is made to fall within the range of from 0.4 to 0.88, the eigenvalue can be shifted to a high frequency as compared with the conventional example, and the vibration can be made difficult to generate.

[Second Embodiment]

It is preferable that an electrophotographic apparatus of the invention includes a reflecting mirror provided in an optical box and for guiding a light beam to a body to be scanned, a first support part which is provided in the optical box, is disposed on the side of a short side of an optical scanning device mount frame, and comes in contact with one end side of the reflecting mirror at one point, a second support part which is disposed on the side of a long side of the optical scanning device mount frame and comes in contact with the other end side of the reflecting mirror at two points, and a pressing unit for pressing the reflecting mirror to the first support part and the second support part.

When the reflecting mirror for guiding the light beam to the body to be scanned is supported at both ends by the first support part provided in the optical box and for performing one-point supporting, and the second support part for performing two-point supporting, the one-point support side susceptible to the influence of vibration, that is, the first support part is provided on the side of the short side of the optical scanning device mount frame which is difficult to vibrate, and the improvement of image quality can be achieved. Besides, since the one-point support side of the reflecting mirror is difficult to vibrate, it is not necessary to bond the reflecting mirror to another member at a part other than the first support part, and the manufacturing cost can be suppressed to the minimum.

Hereinafter, a more specific example will be described with reference to FIGS. 9 to 11B. Incidentally, the same structure as that of the first embodiment is denoted by the same reference character, and the explanation will be omitted.

Figure 9:
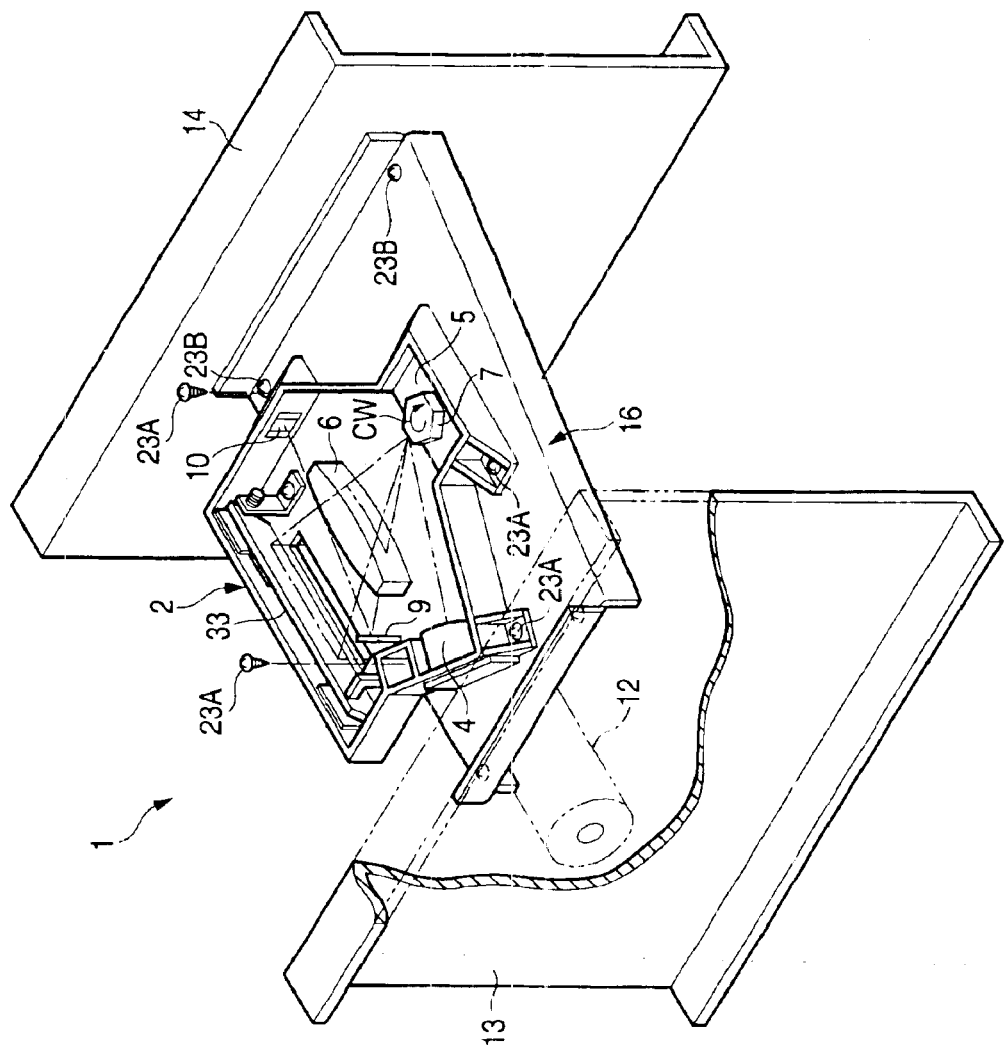
FIG. 9 is an explanatory view of a second embodiment of an electrophotographic apparatus to which the invention is applied.
Figure 10A:
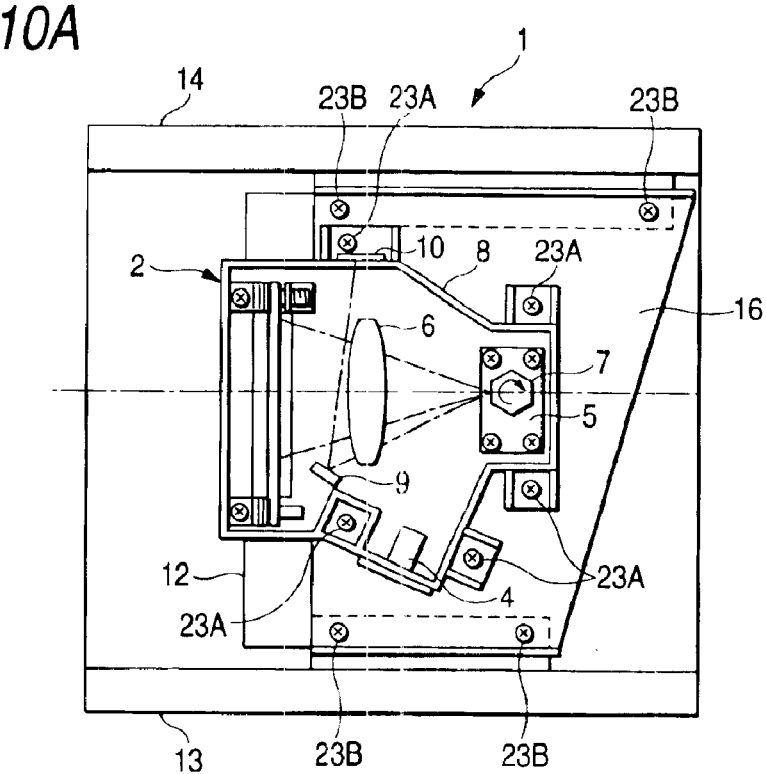
FIGS. 10A and 10B are a plan view and a sectional view of FIG. 9.
Figure 10B:
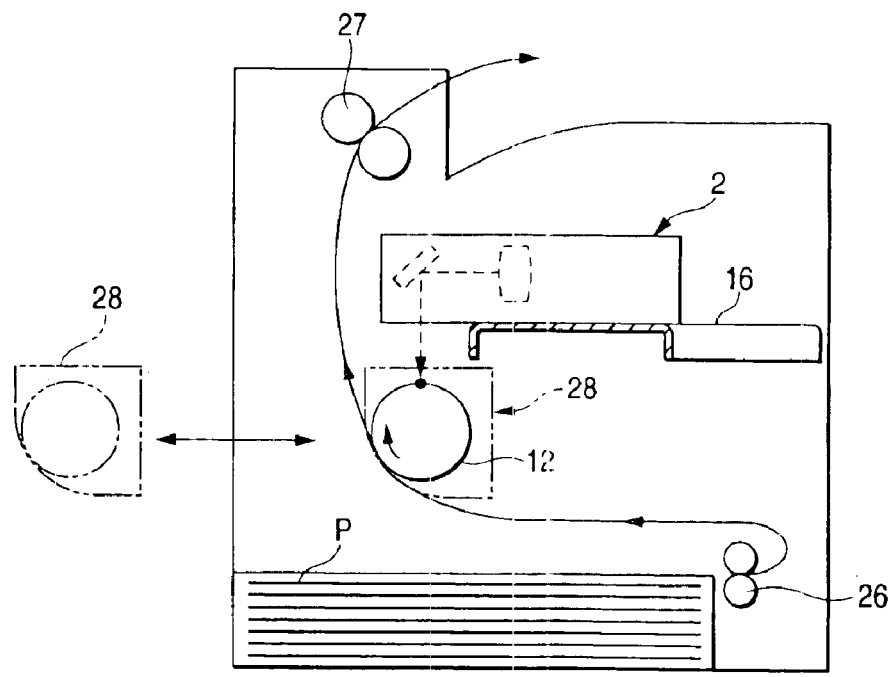

As shown in FIG. 9 and FIGS. 10A and 10B, a difference from the first embodiment is that the shape of an optical scanning device mount frame 16 is opposite, and a reflecting mirror 33 for guiding a light path to a body 12 to be scanned is included.

Figure 11A:
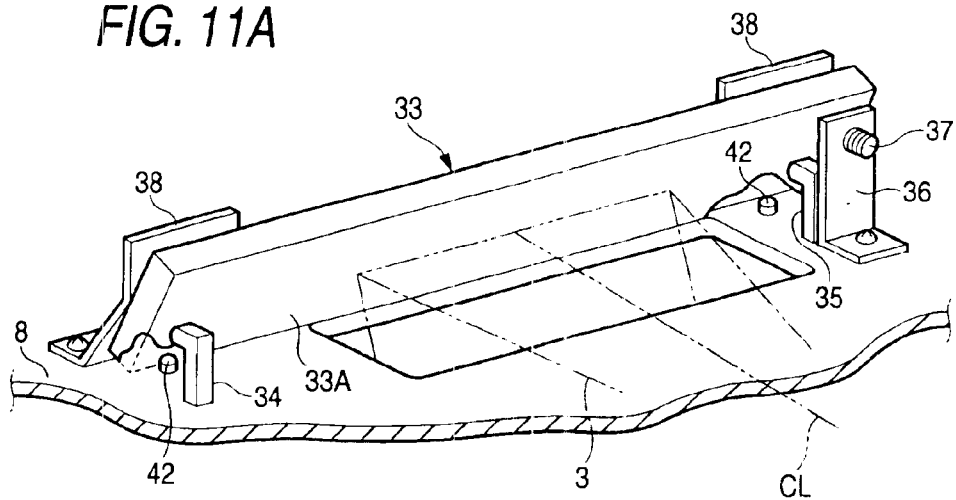
FIGS. 11A and 11B are detailed views of a reflecting mirror of FIG. 9.

As shown in FIG. 11A, a bottom of an optical box 8 is provided with a pair of projections 42 disposed at both sides with respect to a center line CL of the optical scanning device mount frame, a short side support part 34 disposed on the side of the short side of the optical scanning device mount frame 16 with respect to the center line CL of the optical scanning device mount frame, a long side support part 35 disposed on the side of the long side of the optical scanning device mount frame 16 with respect to the center line CL of the optical scanning device mount frame, and an adjustment member 36.

The projections 42, the short side support part 34, and the long side support part 35 are integrally formed on the optical box 8.

The lower end edge of the reflecting mirror 33 is made to come in contact with the pair of projections 42, and a reflection plane 33A is made to come in contact with the short side support part 34, the long side support part 35, and an adjustment screw 37 attached to the adjustment member 36.

Elastic bodies (plate springs) 38 are attached to the bottom of the optical box 8 at opposite sides to the short side support part 34 and the long side support part 35 through the reflecting mirror 33, and the elastic bodies 38 press the reflecting mirror 33 to the short side support part 34, the long side support part 35 and the adjustment screw 37.

Thus, the reflection plane 33A of the reflecting mirror 33 is supported at three points of the short side support part 34, the long side support part 35 and the adjustment screw 37 attached to the adjustment member 36.

Figure 11B:
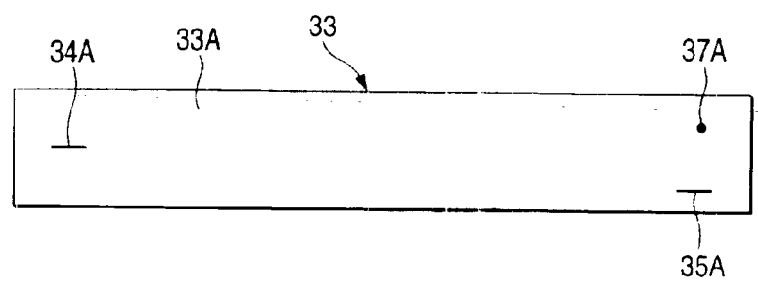

Incidentally, on the reflection plane 33A of the reflecting mirror 33 shown in FIG. 11B, reference numeral 34A denotes a point of contact of the short side support part 34; 35A, a point of contact of the long side support part 35; and 37A, a point of contact of the adjustment screw 37.

The angle of the reflecting mirror 33 is determined by pulling out and adjusting the adjustment screw 37 attached to the adjustment member 36 so that the light beam 3 is guided to a desired position of the body 12 to be scanned.

In this embodiment, since the short side support part 34 for supporting the reflecting mirror 33 at the one point is placed on the side of the short side where deformation at the time of vibration of the optical scanning device mount frame 16 is small, the improvement of image quality can be achieved.

Besides, since it becomes unnecessary to apply an adhesive to the one-point support side contrary to the conventional apparatus, the manufacturing cost can be suppressed.

Incidentally, the shape of the optical scanning device mount frame 16 has only to be an asymmetrical shape with respect to the center line of the optical scanning device mount frame, and it is not limited to the shape shown in FIG. 5.

Hereinafter, other examples of the optical scanning device mount frame 16 will be described.

Figure 12A:
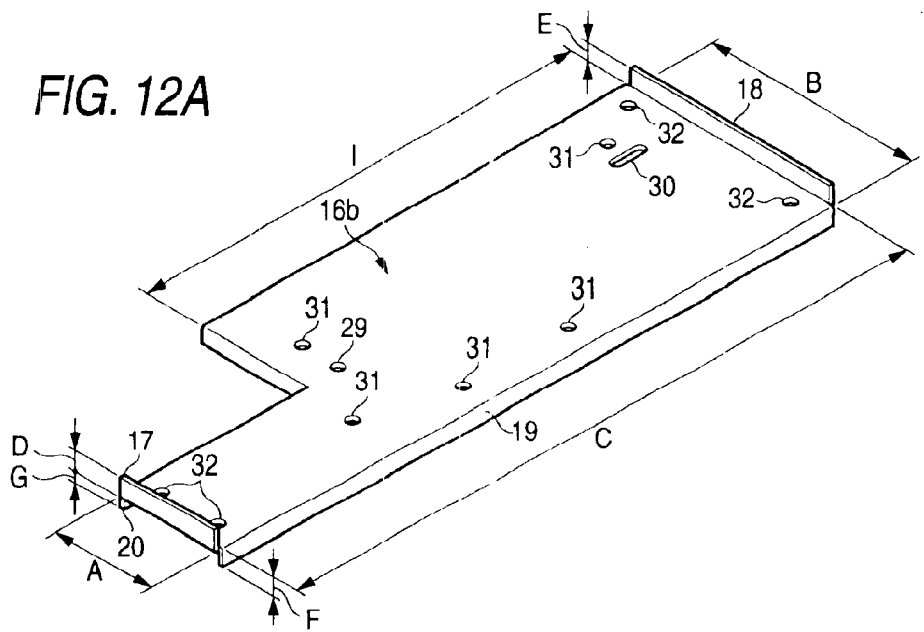
FIGS. 12A and 12B are views of a modified example of an optical scanning device mount frame of the invention.
Figure 12B:
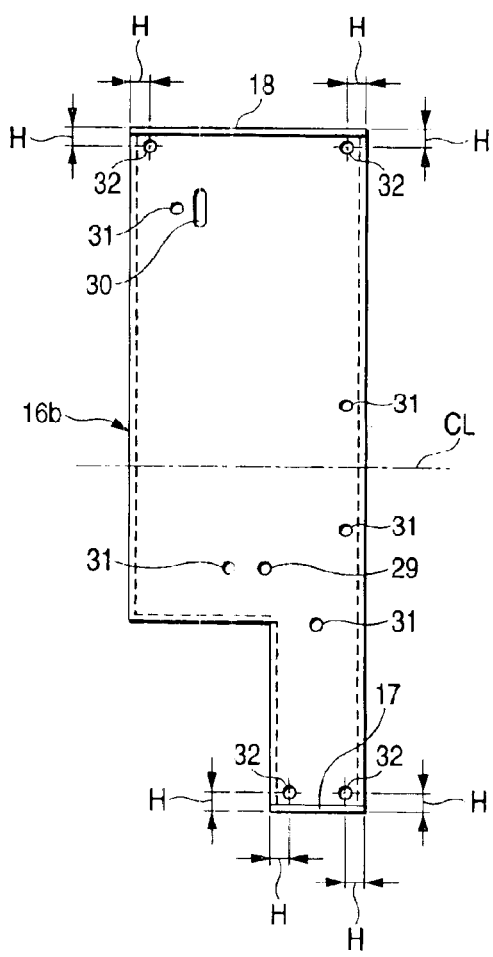

An optical scanning device mount frame 16b of FIGS. 12A and 12B is an example in which a rectangular part of a rectangle on the side of a first frame is cut away, A is 50 mm, I is 270 mm, and others have the same sizes as FIG. 5. Also in this embodiment, in the inside of the first frame 13, a driving device 15 can be disposed at the notch portion of the optical scanning device mount frame 16b, and the depth size of the electrophotographic apparatus 1 can be reduced.

Figure 13A:
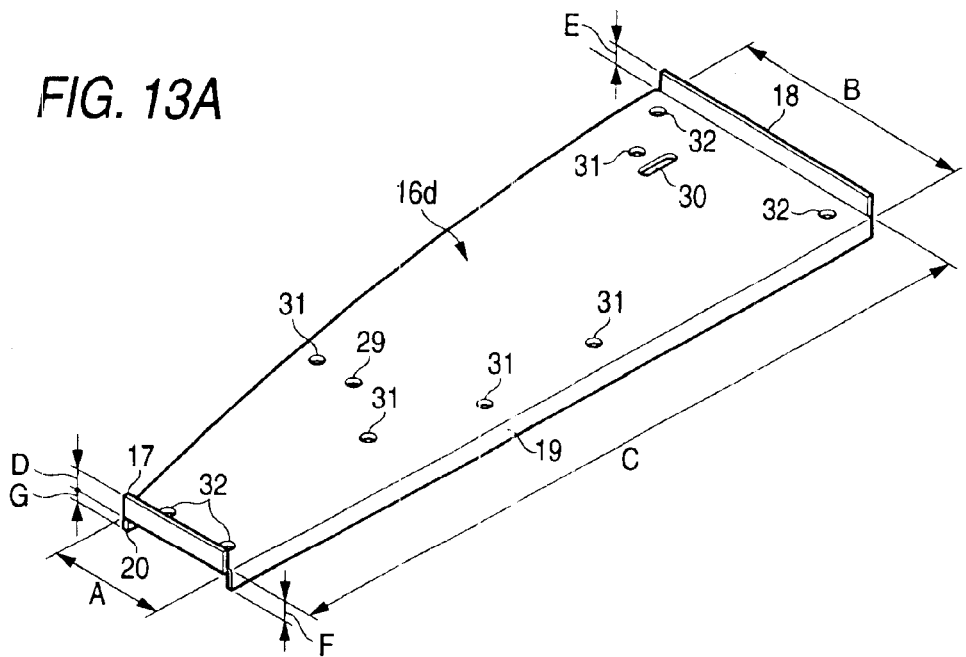
FIGS. 13A and 13B are views of a modified example of an optical scanning device mount frame of the invention.
Figure 13B:
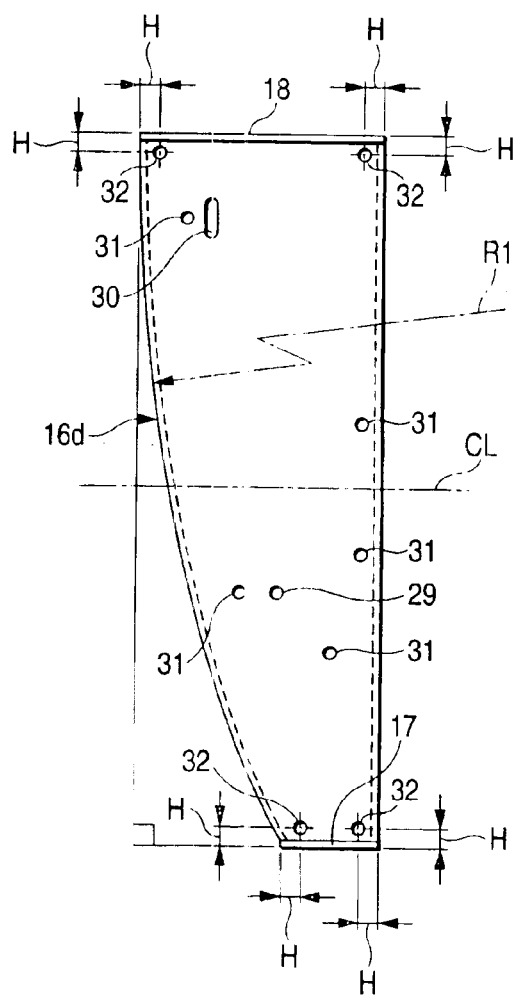
Figure 14:
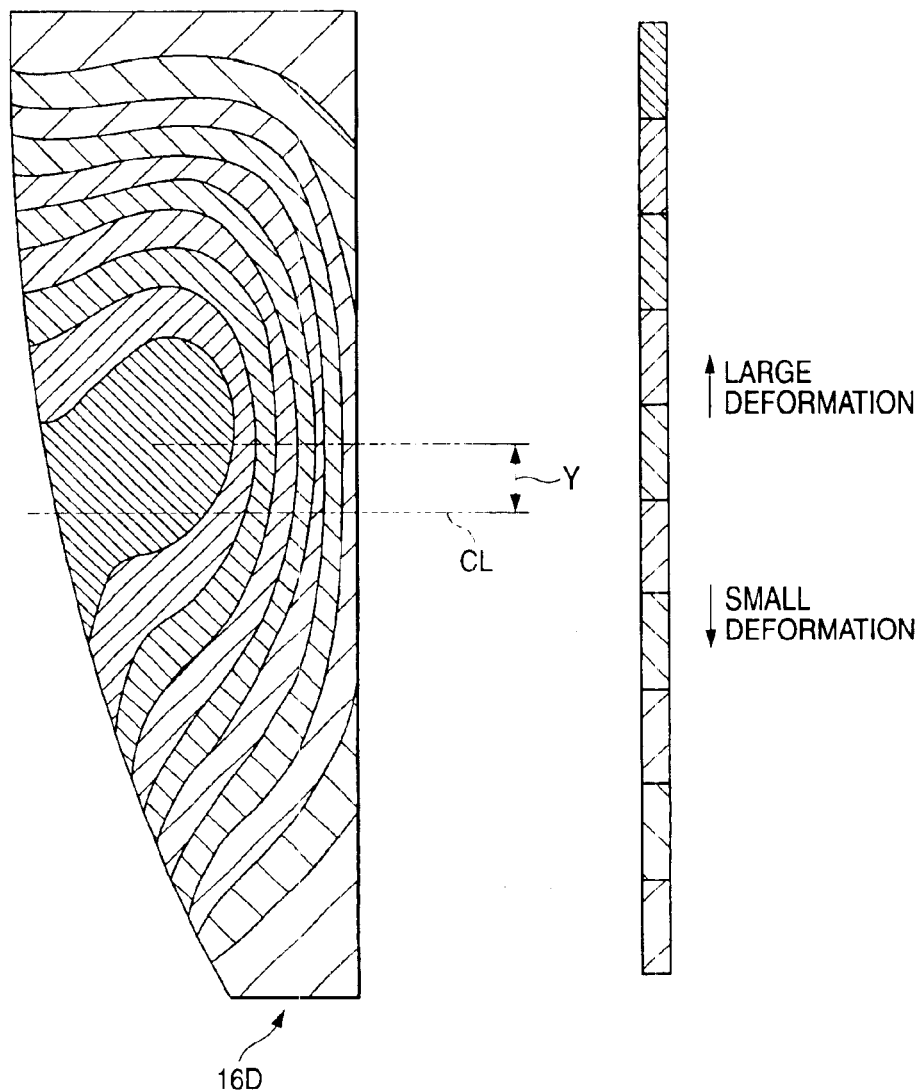
FIG. 14 is a view showing the analysis result of the optical scanning device mount frame of FIGS. 13A and 13B.

An optical scanning device mount frame 16d of FIGS. 13A and 13B is an example in which A of FIG. 5 is 50 mm, a line of a fourth bent part 20 is newly made an outwardly convex arc curve (an arc having a radius R1, tangent to a perpendicular line drawn from the left end of a second bent part 18 to a first bent part 17 at the left end, and connecting the left end of the second bent part 18 and the left end of the first bent part 17), and others are made the same as those of FIG. 5. In this optical scanning device mount frame 16d, the primary eigenvalue is 193 Hz and can be shifted to a higher frequency than the conventional example of FIG. 3. As shown in FIG. 14, the maximum deformation position on the optical scanning device mount plane of the optical scanning device mount frame 16d is shifted toward the long side by 19.4 mm (Y) with respect to the center line CL of the frame.

Figure 15A:
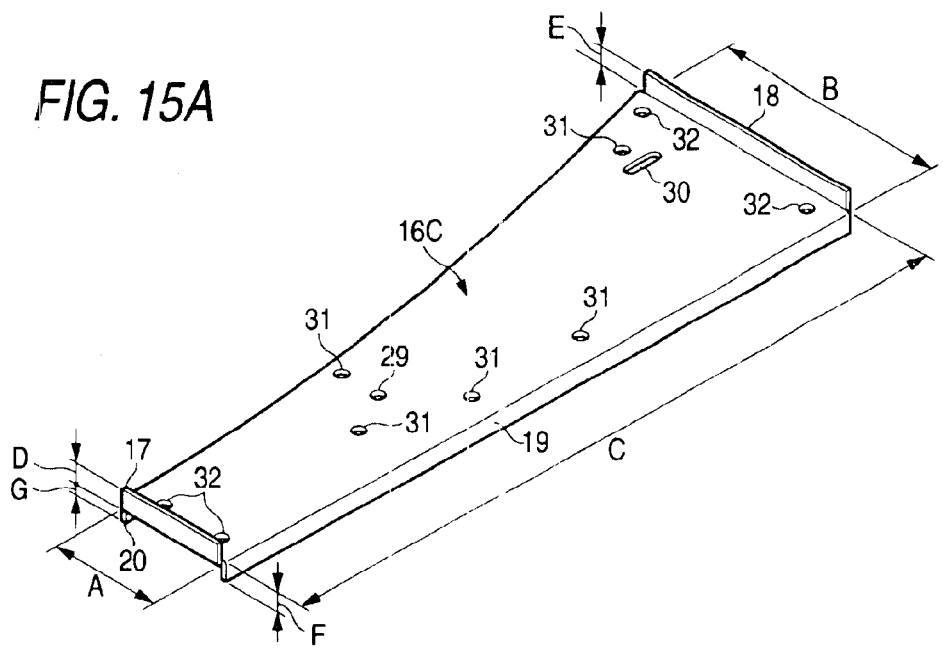
FIGS. 15A and 15B are views of a modified example of an optical scanning device mount frame of the invention.
Figure 15B:
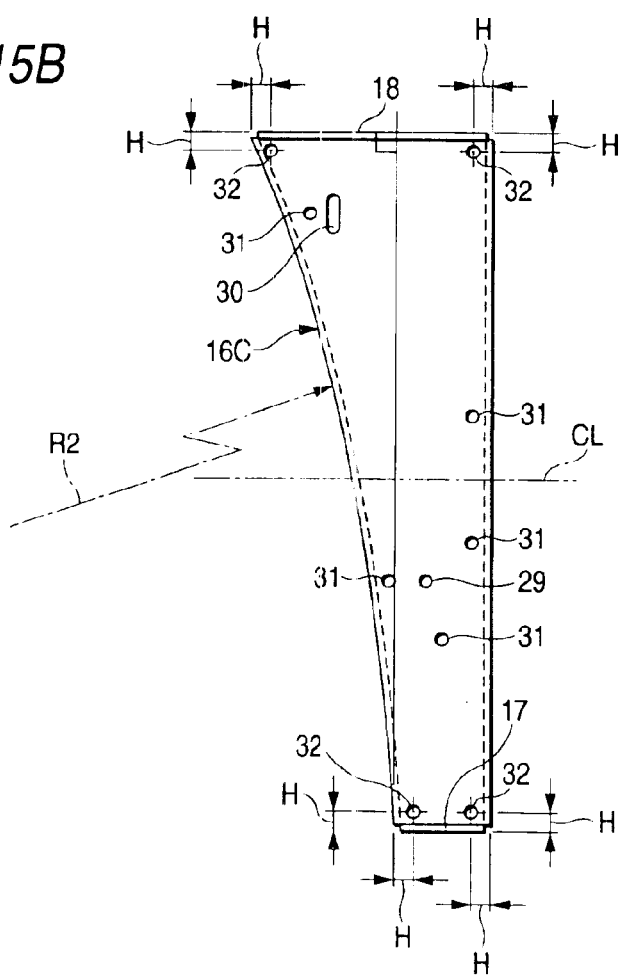
Figure 16:
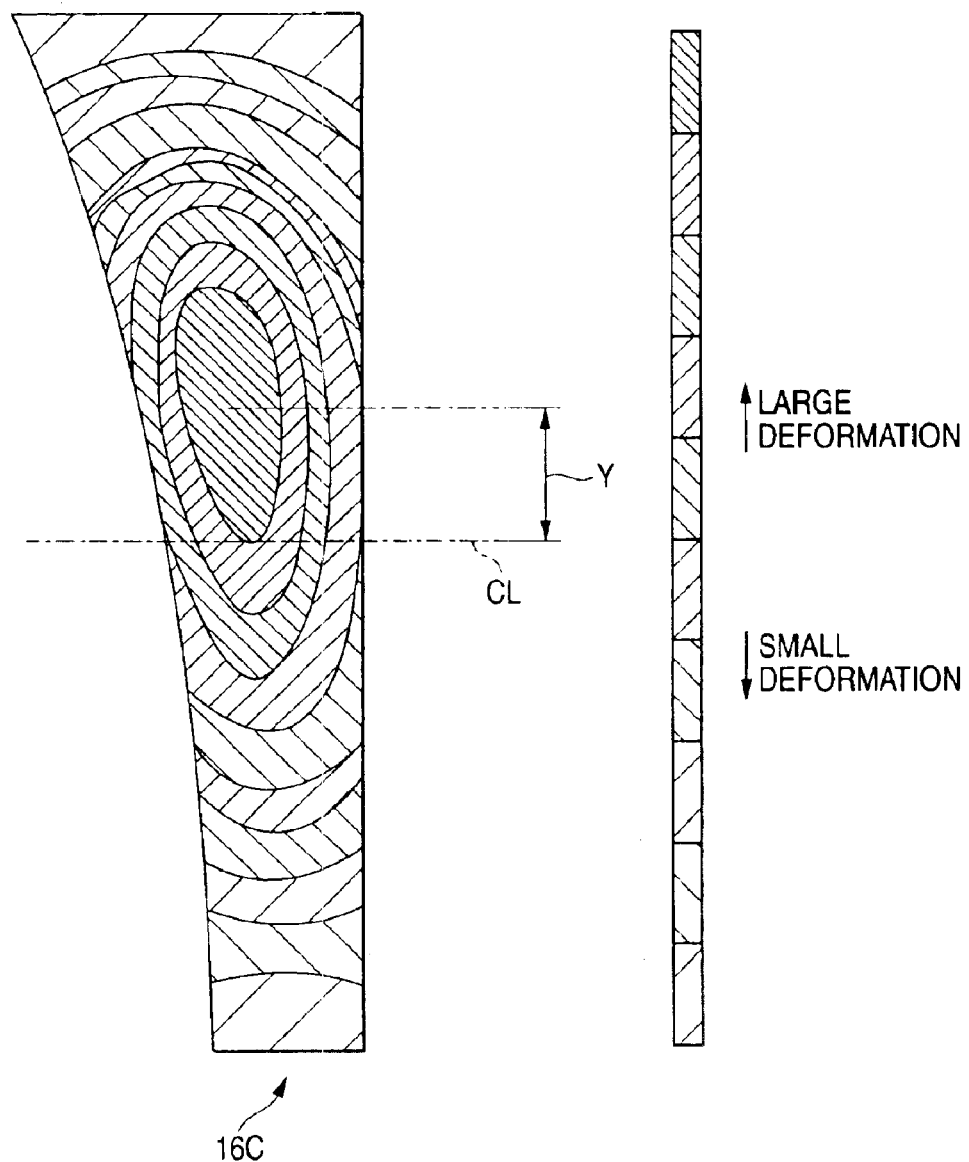
FIG. 16 is a view showing the analysis result of the optical scanning device mount frame of FIGS. 15A and 15B.

An optical scanning device mount frame 16c of FIGS. 15A and 15B is an example in which A of FIG. 5 is 50 mm, a line of a fourth bent part 20 is newly made an inwardly convex arc curve (an arc having a radius R2, tangent to a perpendicular line drawn from the left end of a first bent part 17 to a second bent part 18 at the left end, and connecting the left end of the first bent part 17 and the left end of the second bent part 18), and others are made as those of FIG. 5. In the optical scanning device mount frame 16c, the primary eigenvalue is 228 Hz and can be shifted to a higher frequency than the conventional example of FIG. 3. As shown in FIG. 16, the maximum deformation position on the optical scanning device mount plane of the optical scanning device mount frame 16c is shifted toward the long side by 51.8 mm (Y) with respect to the center line CL of the frame.

Figure 17A:
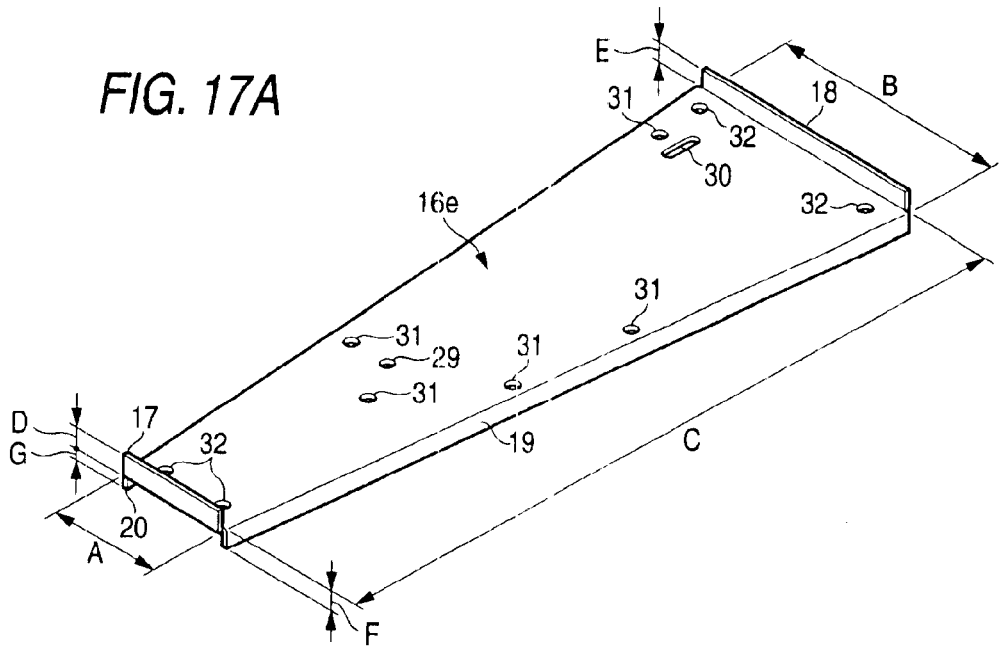
FIGS. 17A and 17B are views of a modified example of an optical scanning device mount frame of the invention.
Figure 17B:
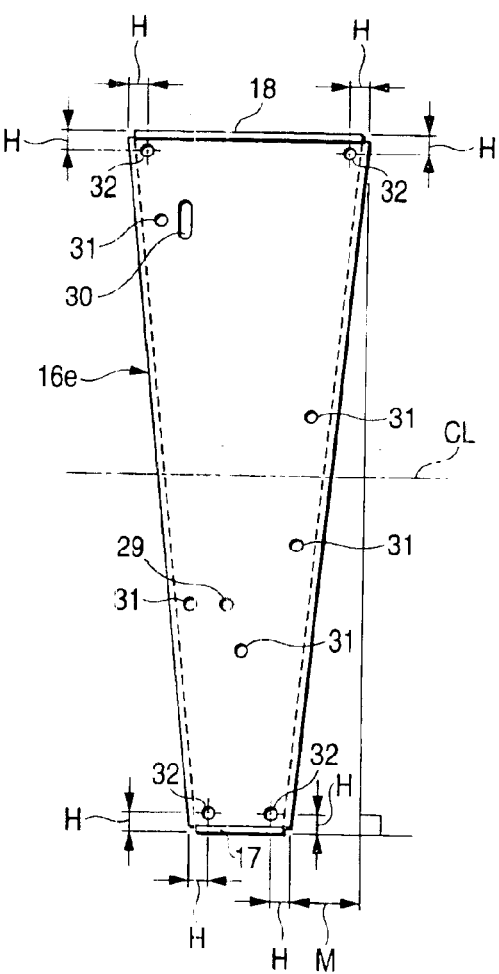
Figure 18:
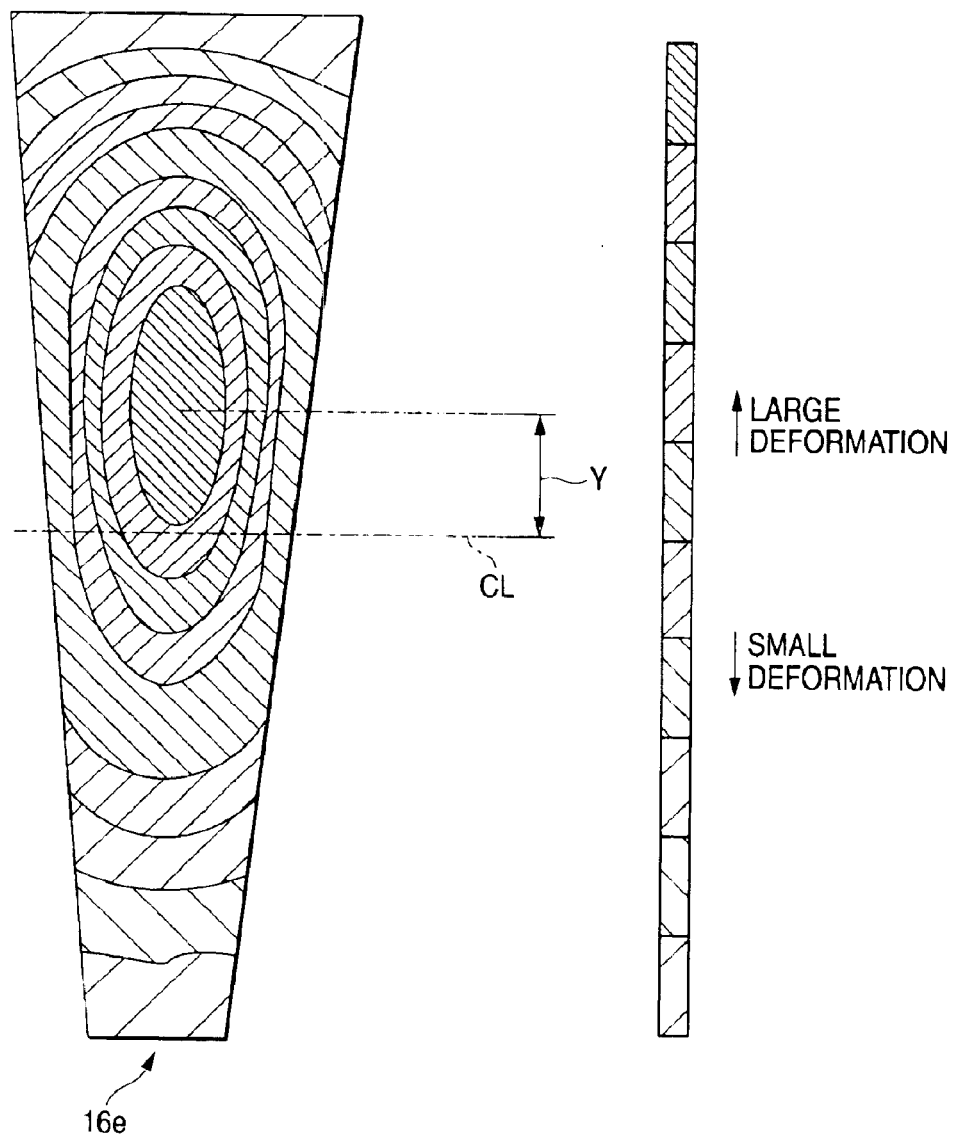
FIG. 18 is a view showing the analysis result of the optical scanning device mount frame of FIGS. 17A and 17B.

An optical scanning device mount frame 16e of FIGS. 17A and 17B is an example in which a first bent part 17 is spaced apart from a right end of a second bent part 18 by 37.5 mm (M) to 50 mm (A), a third bent part 19 and a fourth bent part 20 are made linear, and others are made the same as those of FIG. 5. In this optical scanning device mount frame 16e, the primary eigenvalue is 217 Hz and can be shifted to a higher frequency than the conventional example of FIG. 3. As shown in FIG. 18, the maximum deformation position on the optical scanning device mount plane of the optical scanning device mount frame 16e is shifted toward the long side by 50.3 mm (Y) with respect to the center line CL of the frame.

Figure 19A:
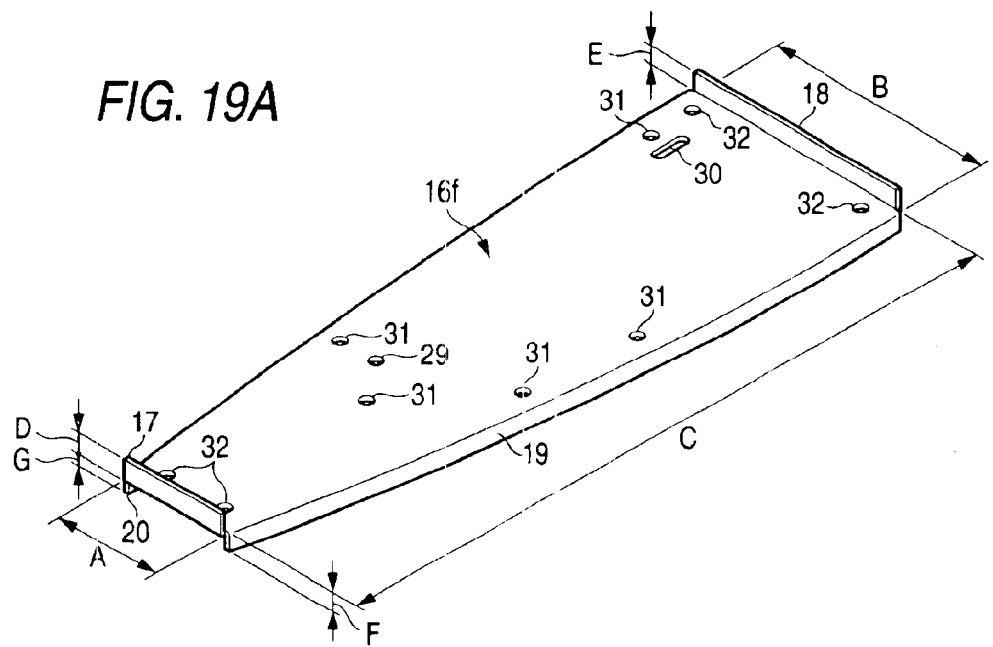
FIGS. 19A and 19B are views of a modified example of an optical scanning device mount frame of the invention.
Figure 19B:
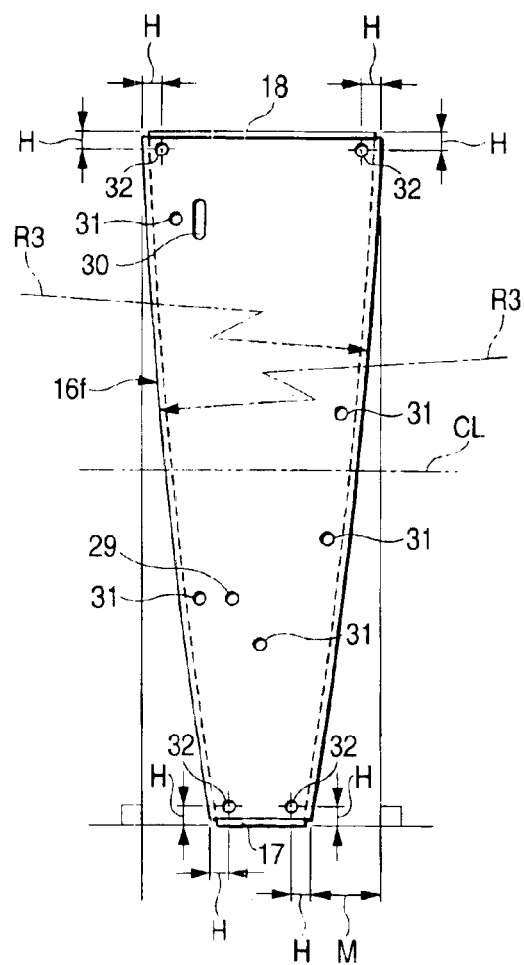
Figure 20:
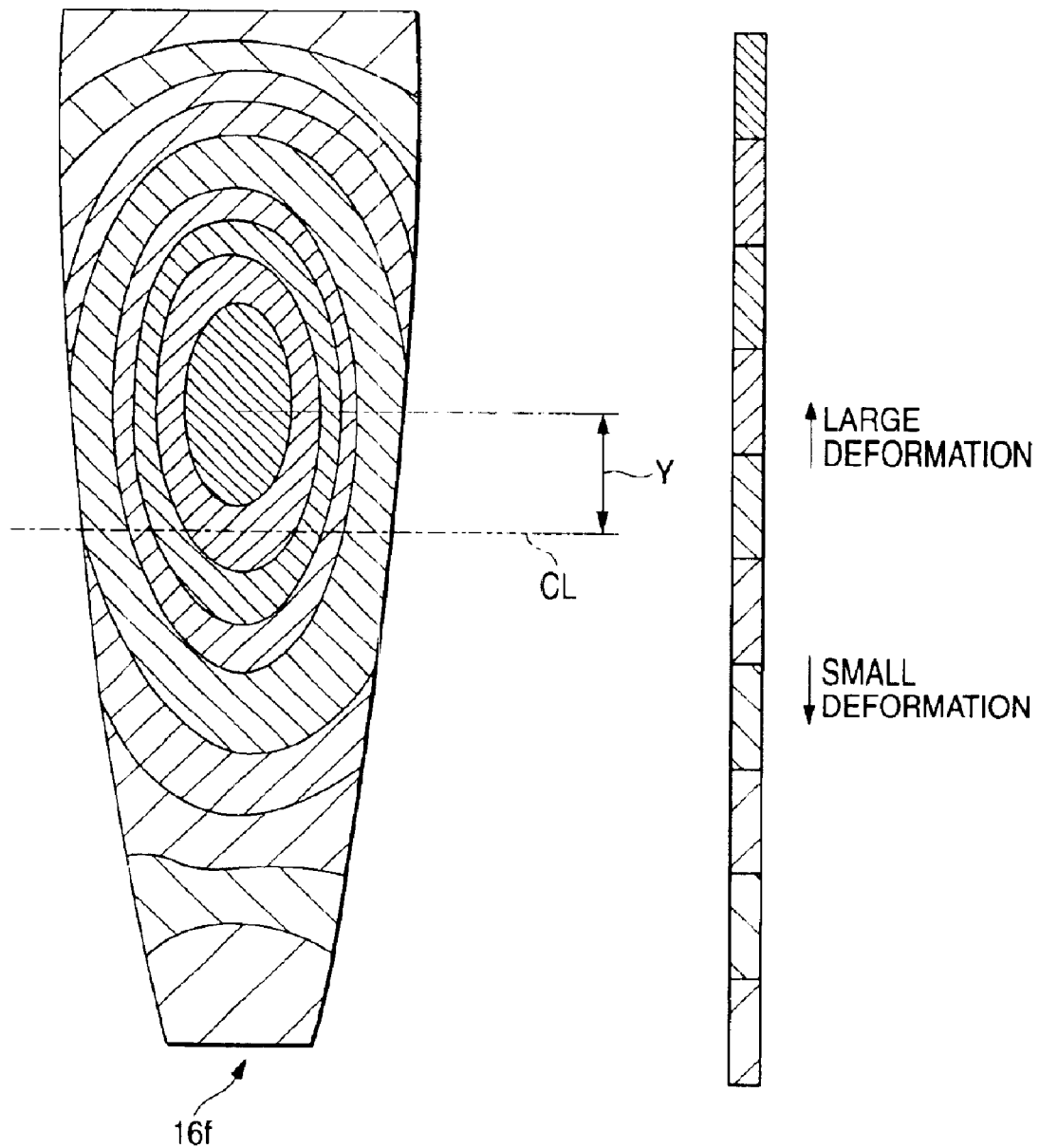
FIG. 20 is a view showing the analysis result of the optical scanning device mount frame of FIGS. 19A and 19B.

An optical scanning device mount frame 16f of FIGS. 19A and 19B is an example in which a first bent part 17 is spaced apart from a right end of a second bent part 18 by 37.5 mm (M) to 50 mm (A), a line of a third bent part 19 is made an outwardly convex arc curve (an arc having a radius R3, tangent to a perpendicular line drawn from the right end of the second bent part 18 to the first bent part 17 at the right end, and connecting the right end of the second bent part 18 and the right end of the first bent part 17), a line of a fourth bent part 20 is made an outwardly convex arc curve (an arc having a radius R3, tangent to a perpendicular line drawn from the left end of the second bent part 18 to the first bent part 17 at the left end, and connecting the left end of the second bent part 18 and the left end of the first bent part 17), and others are the same as those of FIG. 5. In this optical scanning device mount frame 16f, the primary eigenvalue is 206 Hz and can be shifted to a higher frequency than the conventional example of FIG. 3. As shown in FIG. 20, the maximum deformation position on the optical scanning device mount plane of the optical scanning device mount frame 16f is shifted toward the long side by 42.3 mm (Y) with respect to the center line CL of the frame.

Figure 21A:
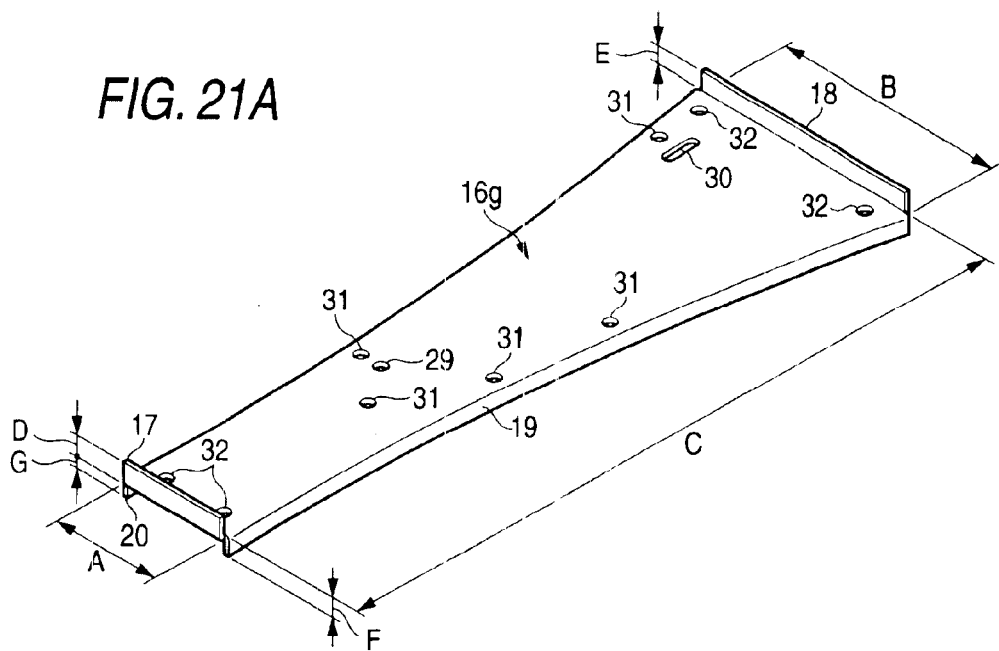
FIGS. 21A and 21B are views of a modified example of an optical scanning device mount frame of the invention.
Figure 21B:
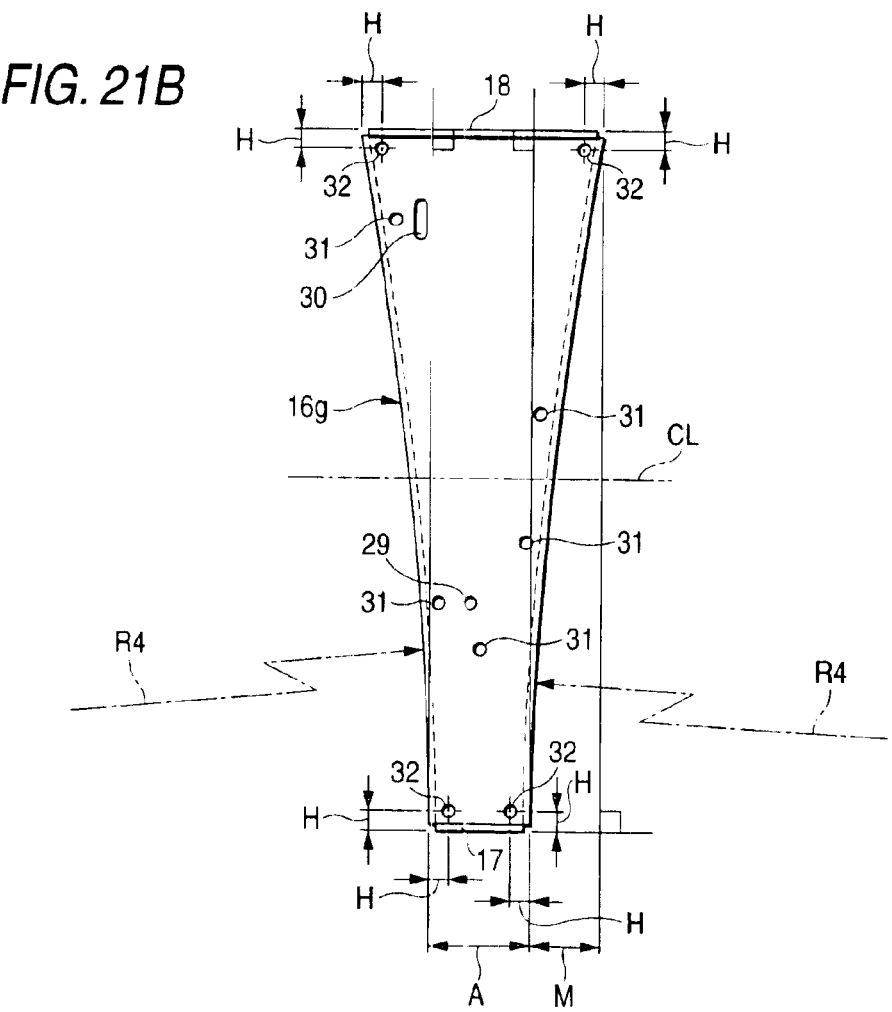
Figure 22:
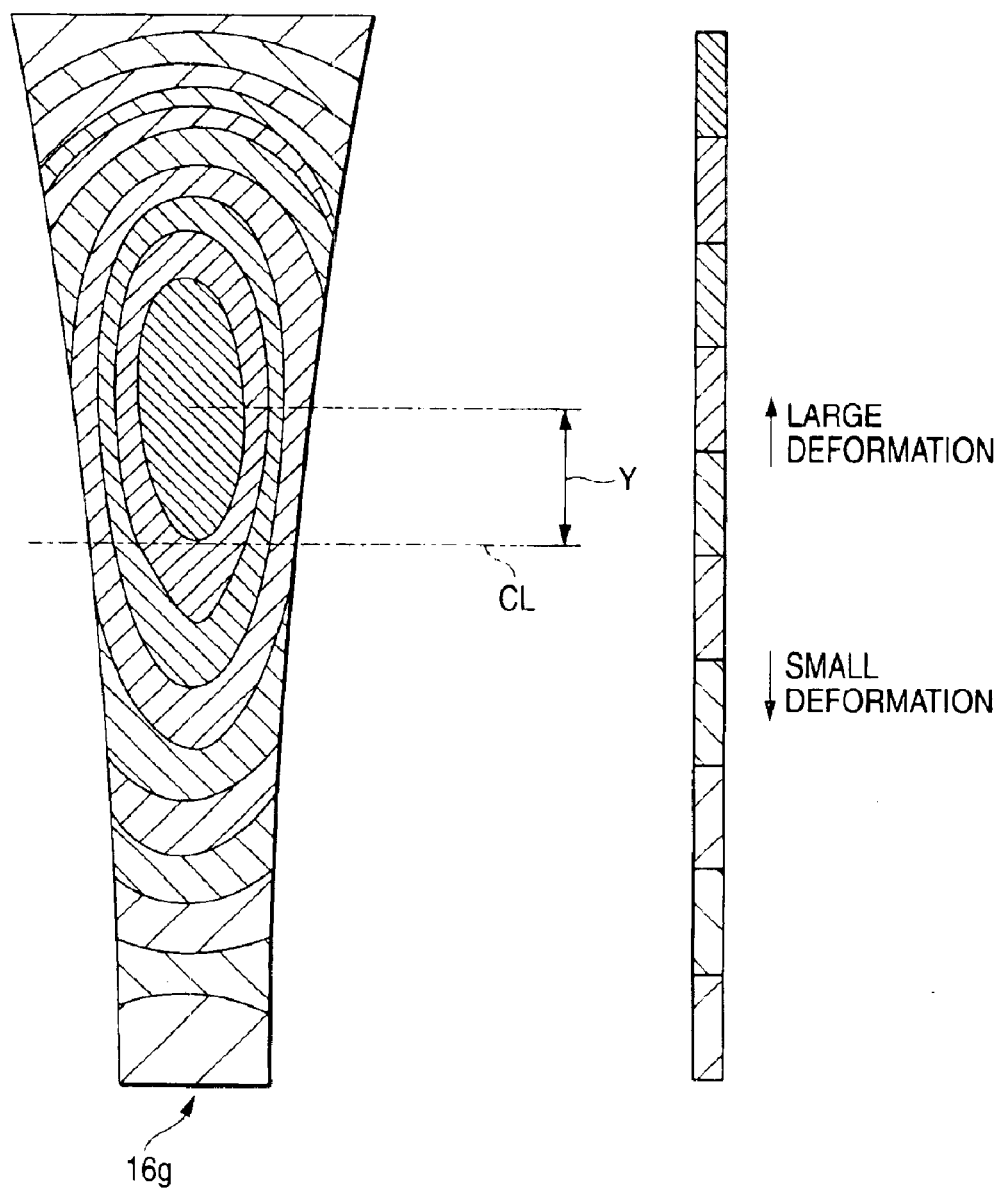
FIG. 22 is a view showing the analysis result of the optical scanning device mount frame of FIGS. 21A and 21B.

An optical scanning device mount frame 16g of FIGS. 21A and 21B is an example in which a first bent part 17 is spaced apart from an end of a second bent part 18 by 37.5 mm (M) to 50 mm (A), a line of a third bent part 19 is made an inwardly convex arc curve (an arc having a radius R4, tangent to a perpendicular line drawn from the right end of the first bent part 17 to the second bent part 18 at the right end, and connecting the right end of the first bent part 17 and the right end of the second bent part 18), a line of a fourth bent part 20 is made an inwardly convex arc curve (an arc having a radius R4, tangent to a perpendicular line drawn from the left end of the first bent part 17 to the second bent part 18 at the left end, and connecting the left end of the first bent part 17 and the left end of the second bent part 18), and others are the same as FIG. 5. In this optical scanning device mount frame 16g, the primary eigenvalue is 222 Hz and can be shifted to a higher frequency than the conventional example of FIG. 3. As shown in FIG. 22, the maximum deformation position on the optical scanning device mount plane of the optical scanning device mount frame 16g is shifted toward the long side by 51 mm (Y) with respect to the center line CL of the frame.

Figure 23A:
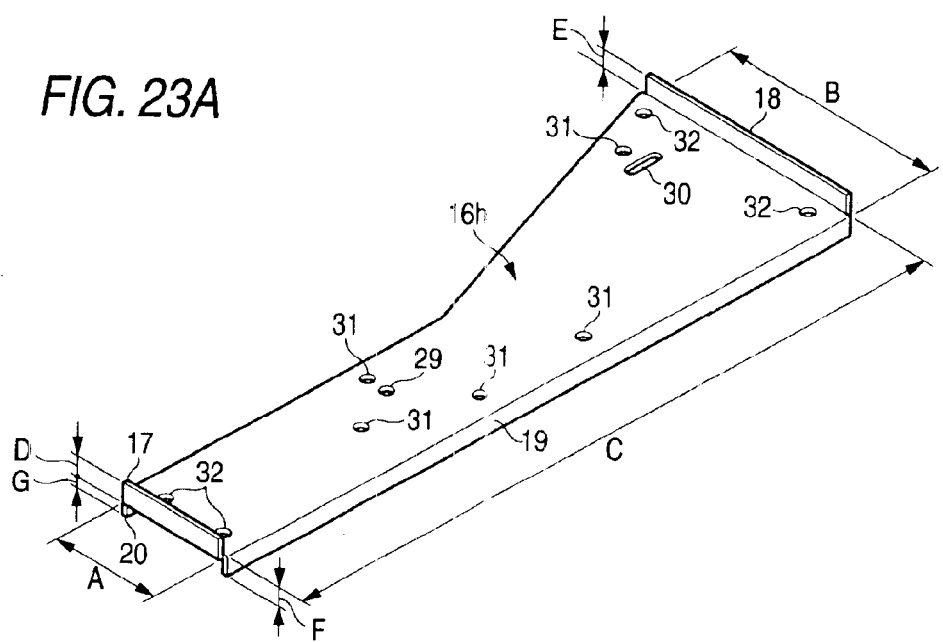
FIGS. 23A and 23B are views of a modified example of an optical scanning device mount frame of the invention.
Figure 23B:
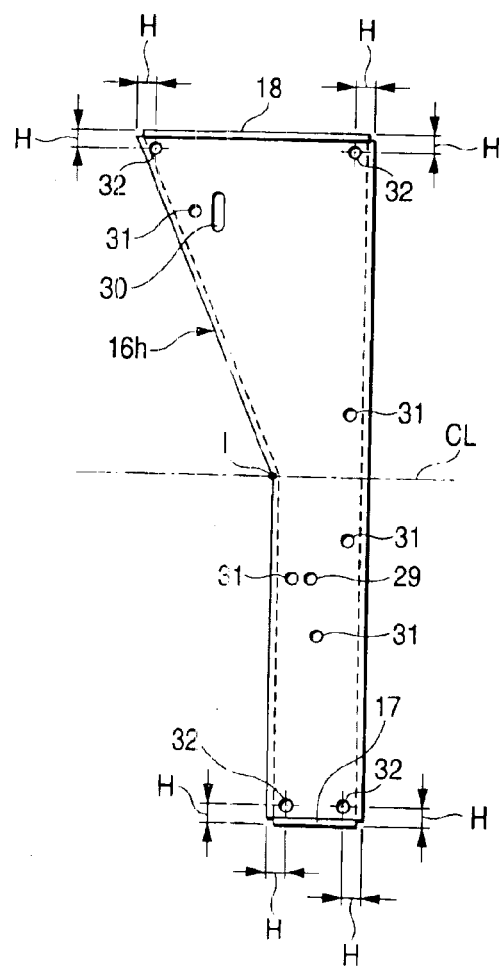
Figure 24:
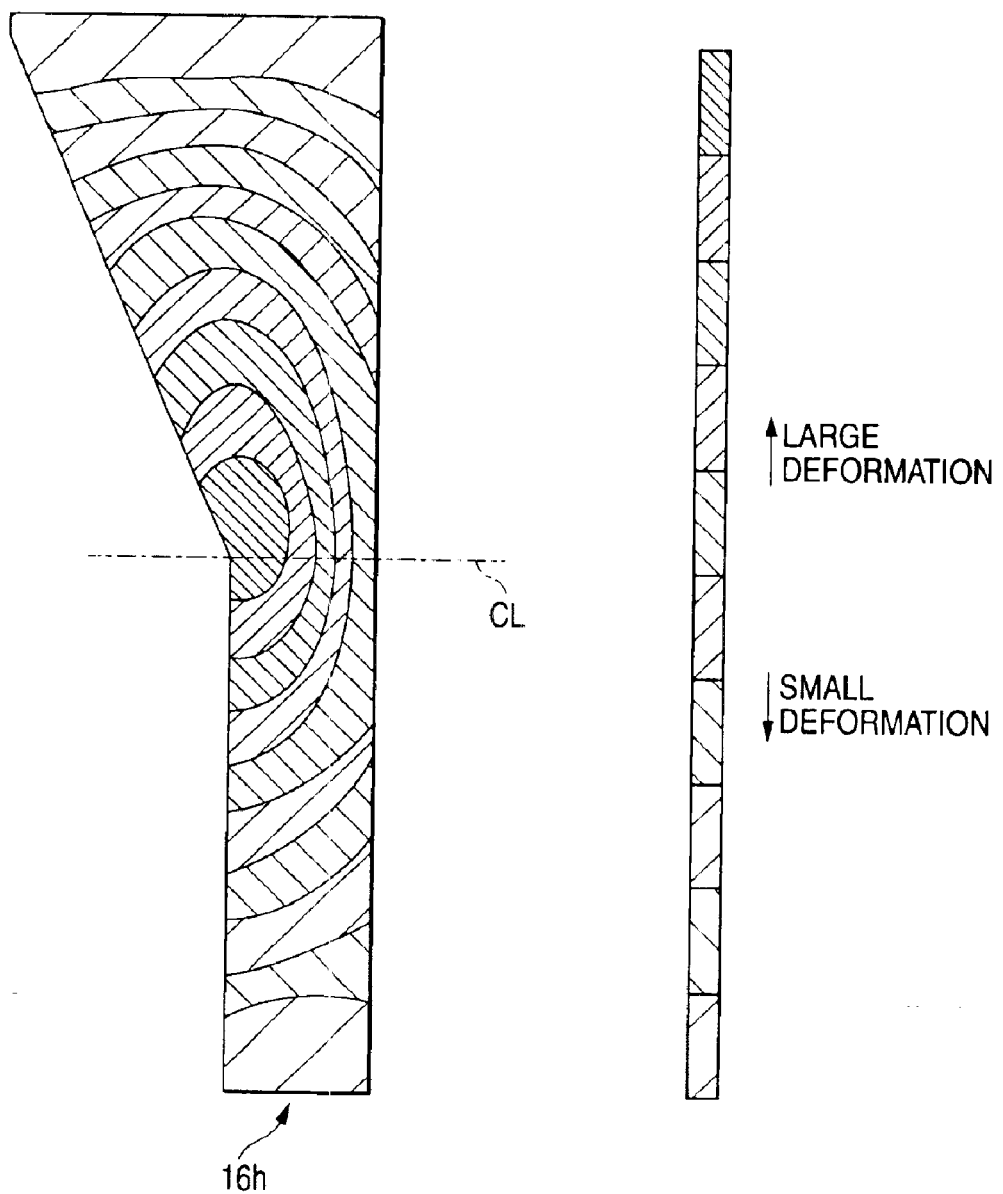
FIG. 24 is a view showing the analysis result of the optical scanning device mount frame of FIGS. 23A and 23B.

An optical scanning device mount frame 16h of FIGS. 23A and 23B is an example in which A of FIG. 5 is made 50 mm, and when an intersection point of a perpendicular line drawn from the left end of a first bent part 17 to a second bent part 18 and the center line CL of the optical scanning device mount frame 16*h* is made an inflection point I, a fourth bent part 20 is bent at the inflection point I. Incidentally, a portion between the left end of the first bent part 17 and the inflection point I, and a portion between the left end of the second bent part 18 and the inflection point I are respectively linear, and others are the same as those of FIG. 5. In this optical scanning device mount frame 16*h*, the primary eigenvalue is 209 Hz and can be shifted to a higher frequency than the conventional example of FIG. 3. As shown in FIG. 24, the maximum deformation position on the optical scanning device mount plane of he optical scanning device mount frame 16*f* is substantially coincident with the center line CL.

Figure 25A:
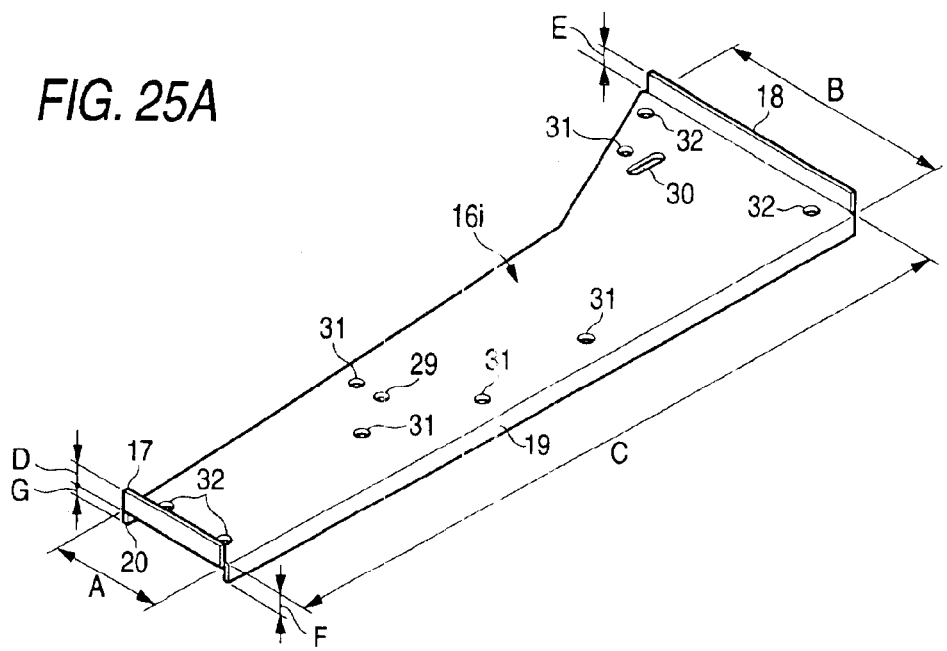
FIGS. 25A and 25B are views of a modified example of an optical scanning device mount frame of the invention.
Figure 25B:
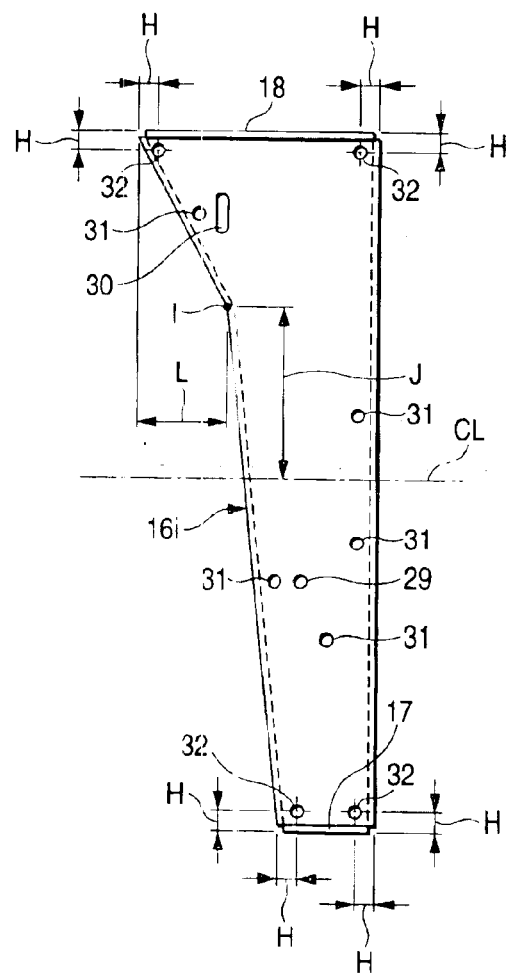
Figure 26:
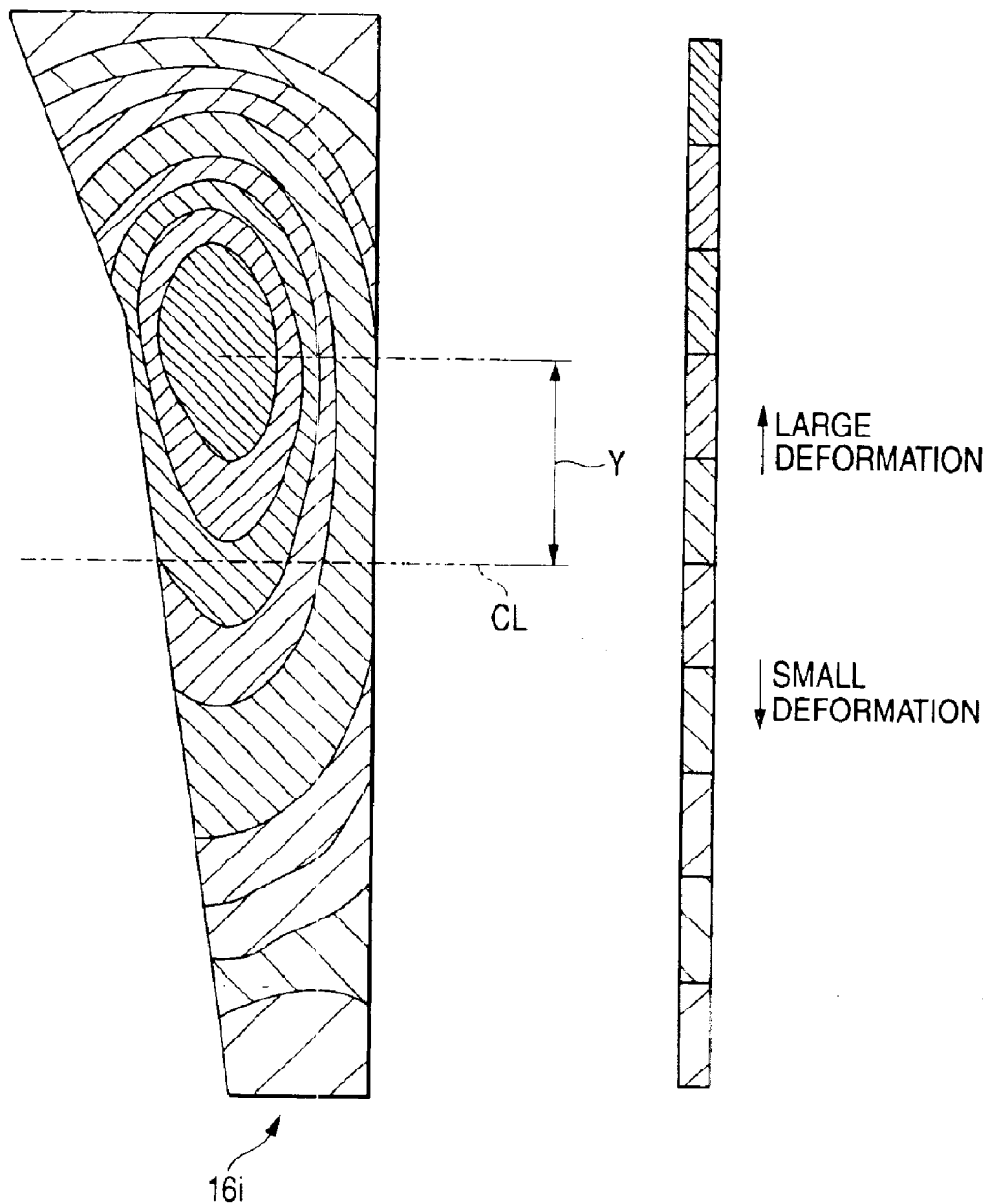
FIG. 26 is a view showing the analysis result of the optical scanning device mount frame of FIGS. 25A and 25B.

An optical scanning device mount frame 16*i* of FIGS. 25A and 25B is an example in which the inflection point I shown in FIGS. 23A and 23B is placed at a position apart from the center line CL of the optical scanning device mount frame 16*i* toward the side of the long side by 92.5 mm (J) and apart from the end of the long side toward the inside by 37.5 mm (N), a portion between the left end of the first bent part 17 and the inflection point I, and a portion between the left end of the second bent part 18 and the inflection point I are respectively made linear, and others are the same as those of FIG. 5. In this optical scanning device mount frame 16*i*, the primary eigenvalue is 209 Hz and can be shifted to a higher frequency than the conventional example of FIG. 3. As shown in FIG. 26, the maximum deformation position on the optical scanning device mount plane of the optical scanning device mount frame 16*i* is shifted toward the long side by 76.2 mm (Y) with respect to the center line CL of the optical scanning device mount frame 16*i*. Incidentally, it is preferable that the inflection point I is positioned inside a perpendicular line drawn from the left end of the first bent part 17 to the second bent part 18, and a line segment (equivalent to FIG. 5) connecting the left end of the first bent part 17 and the left end of the second bent part 18, and is positioned on the side of the long side with respect to the center line CL of the optical scanning device mount frame 16*i*. In that case, it is preferable not to bring the inflection point I close to attachment screw parts 31 of the optical scanning device 2 and a long hole 30.

Figure 27A:
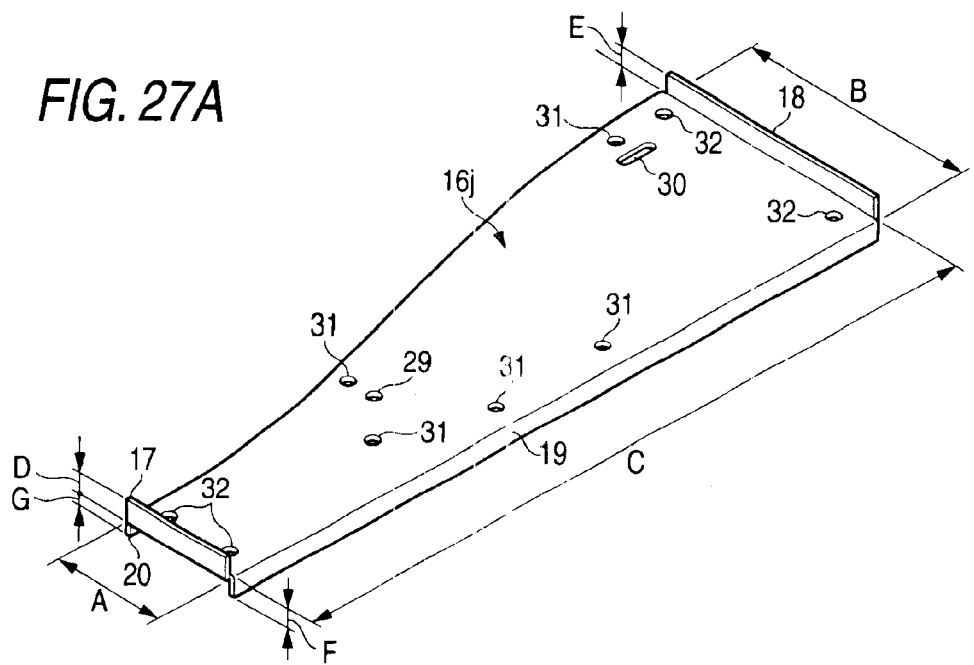
FIGS. 27A and 27B are views of a modified example of an optical scanning device mount frame of the invention.
Figure 27B:
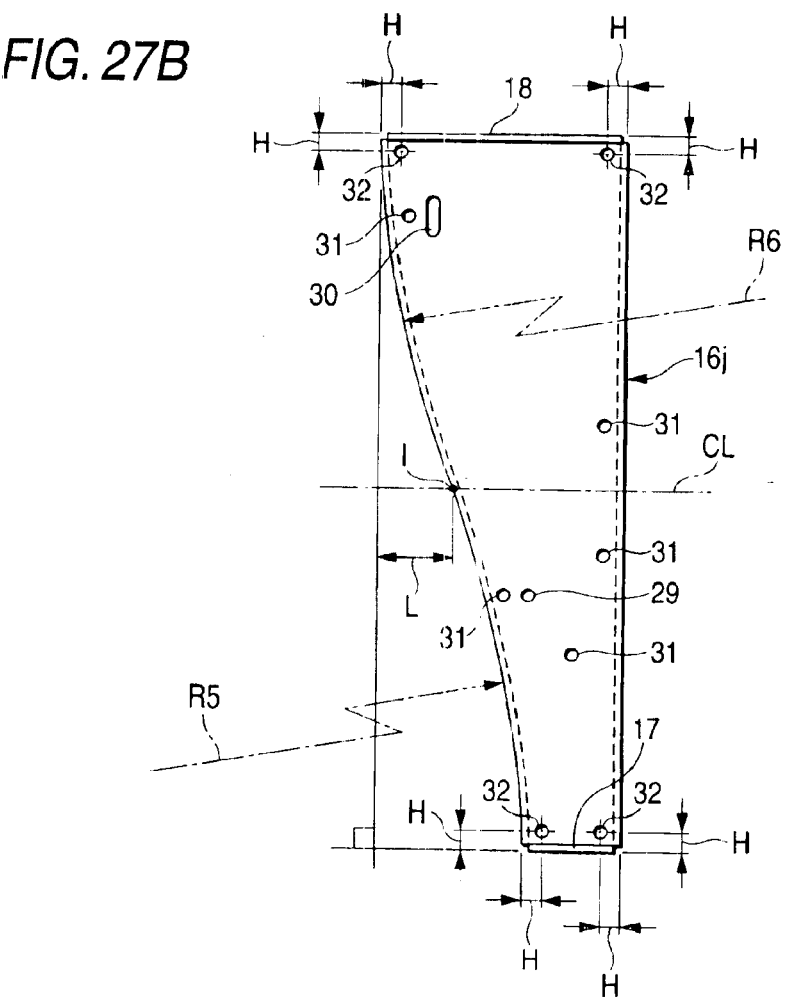
Figure 28:
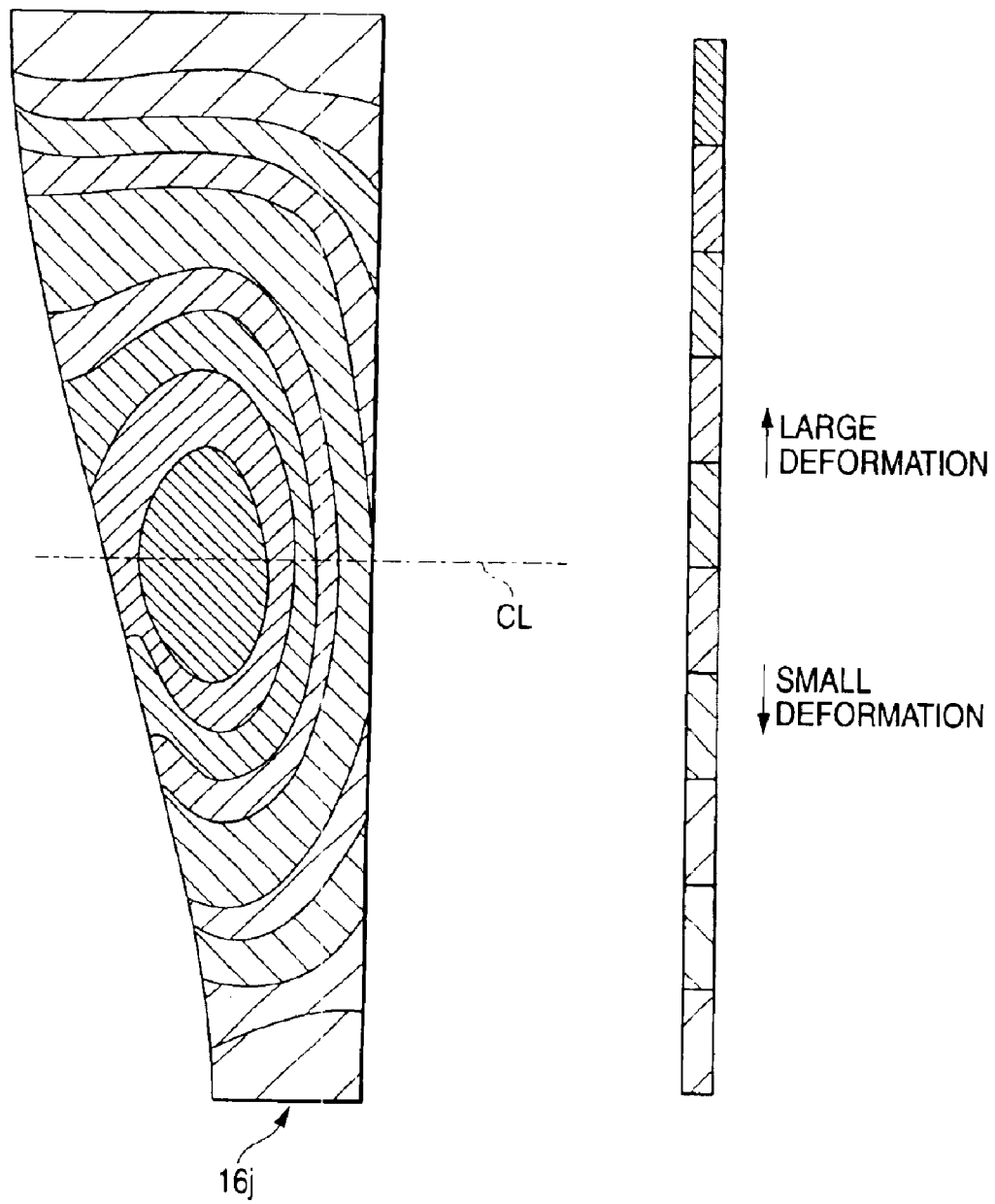
FIG. 28 is a view showing the analysis result of the optical scanning device mount frame of FIGS. 27A and 27B.

In an optical scanning device mount frame 16*j* of FIGS. 27A and 27B, the inflection point I shown in FIGS. 23A and 23B is placed on the center line CL of the optical scanning device mount frame 16*j*, and at a position apart from a perpendicular line drawn from the left end of a second bent part 18 to a first bent part 17 by 37.5 mm (N). In a line of a fourth bent part 20, an inwardly convex arc curve (an arc having a radius R5, tangent to a perpendicular line drawn from the left end of the first bent part 17 to the second bent part 18 at the left end, and connecting the left end and the inflection point I) is smoothly connected to an outwardly convex arc curve (an arc having a radius R6, tangent to a perpendicular line drawn from the left end of the second bent part 18 to the first bent part 17 at the left end, and connecting the left end and the inflection point I), and others are the same as those of FIG. 5. In this optical scanning device mount frame 16*j*, the primary eigenvalue is 201 Hz and can be shifted to a higher frequency than the conventional example of FIG. 3. As shown in FIG. 28, the maximum deformation position on the optical scanning device mount plane of the optical scanning device mount frame 16*j* is substantially coincident with the center line CL of the optical scanning device mount frame 16*j*. Incidentally, in order to position the maximum deformation position on the side of the long side, the inflection point has only to be placed on the side of the long side with respect to the center line CL of the optical scanning device mount frame 16*j*.

Figure 29A:
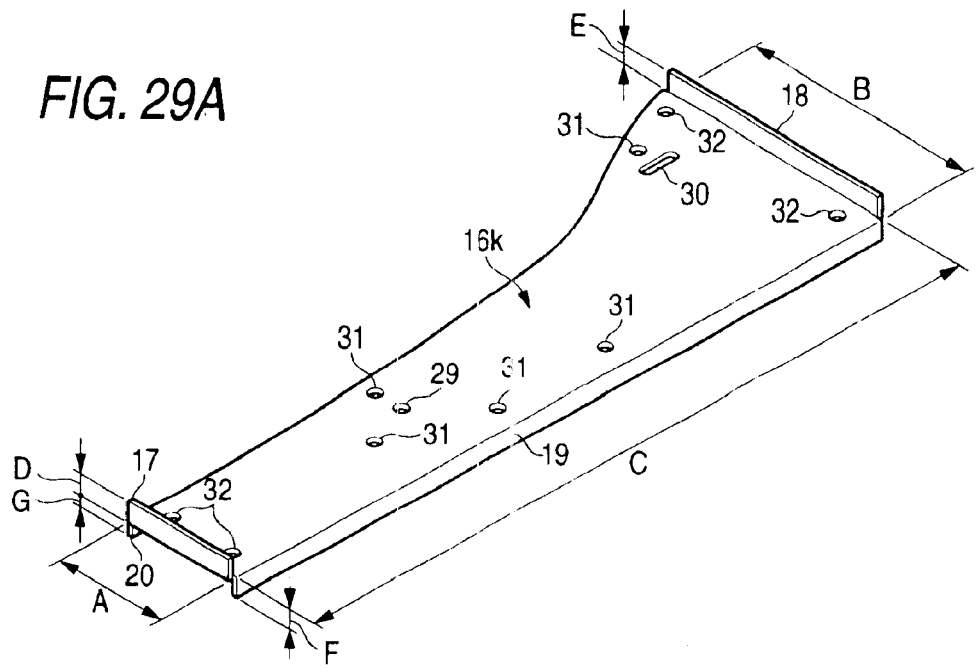
FIGS. 29A and 29B are views of a modified example of an optical scanning device mount frame of the invention.
Figure 29B:
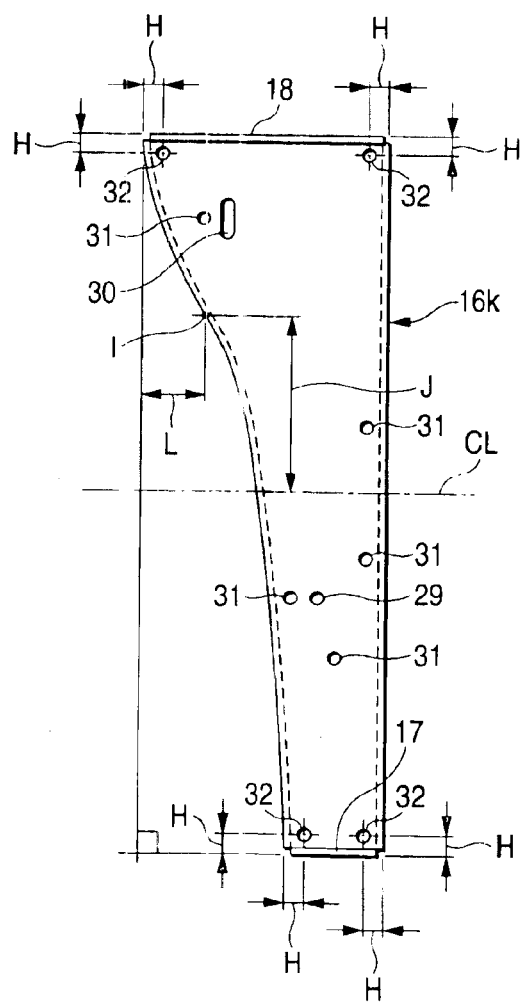
Figure 30:
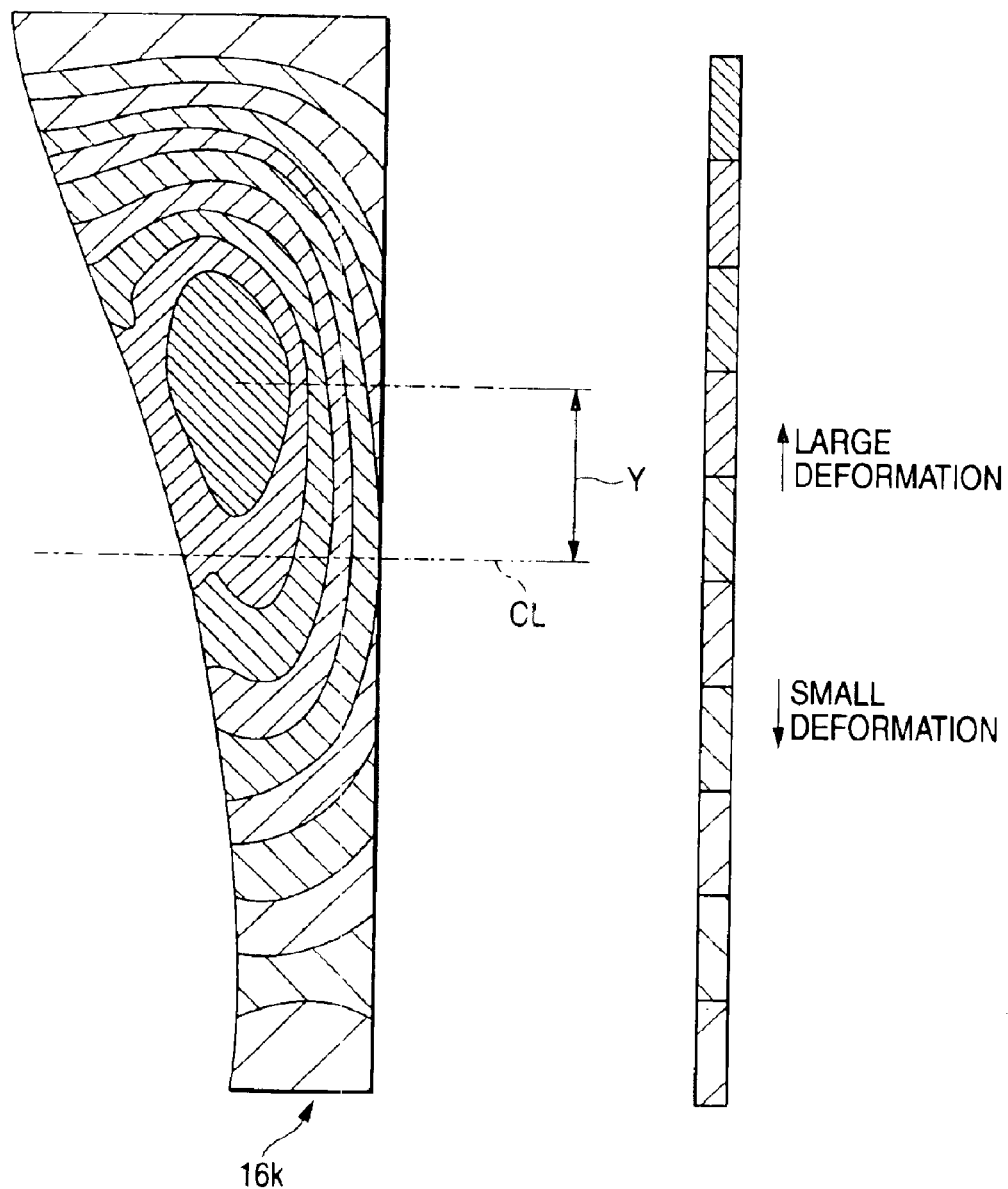
FIG. 30 is a view showing the analysis result of the optical scanning device mount frame of FIGS. 29A and 29B.

An optical scanning device mount frame 16*k* of FIGS. 29A and 29B is a modified example of FIGS. 27A and 27B, in which an inflection point I is changed to a position apart from the center line CL of the optical scanning device mount frame 16*k* toward a second bent part 18 by 92.5 mm (J) and apart from the left end of the second bent part 18 toward the inside by 37.5 mm (N), and others are the same as those of FIGS. 27A and 27B. In this optical scanning device mount frame 16*k*, the primary eigenvalue is 205 Hz and can be shifted to a higher frequency than the conventional example of FIG. 3. As shown in FIG. 30, the maximum deformation position on the optical scanning device mount plane of the optical scanning device mount frame 16*k* is shifted toward the long side by 62.2 mm (Y) with respect to the center line CL of the optical scanning device mount frame 16*k*. Incidentally, it is preferable that the position of the inflection point I is positioned inside a perpendicular line drawn from the left end of the first bent part 17 to the second bent part 18 and a line segment (equivalent to FIG. 5) connecting the left end of the first bent part 17 and the left end of the second bent part 18, and on the side of the long side with respect to the center line CL of the optical scanning device mount frame 16*k*. In that case, it is preferable not to bring the inflection point I close to attachment screw parts 31 of the optical scanning device 2 and a long hole 30.

[Third Embodiment]

Figure 31A:
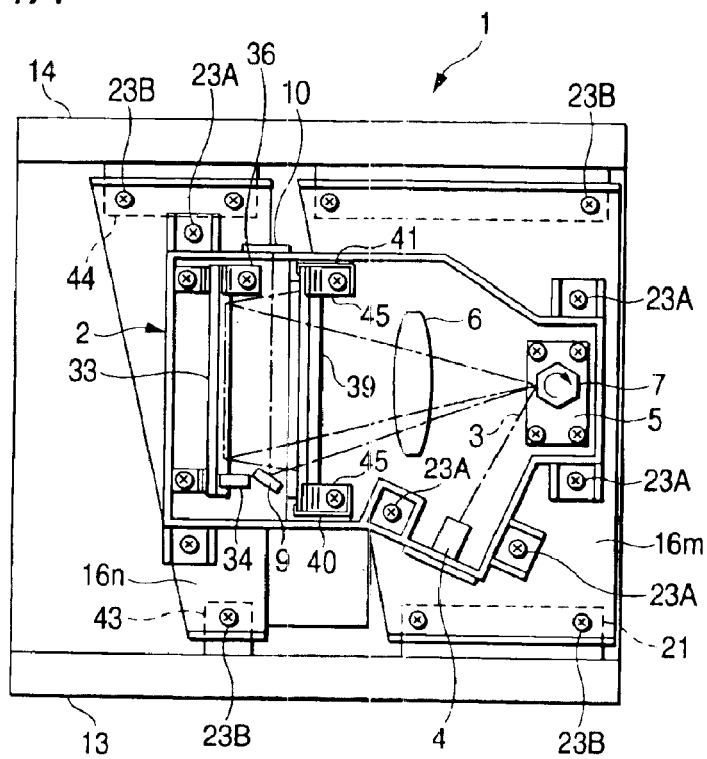
FIG. 31A is a partially sectional view showing a rough structure of an electrophotographic apparatus of a third embodiment when viewed from above.
Figure 31B:
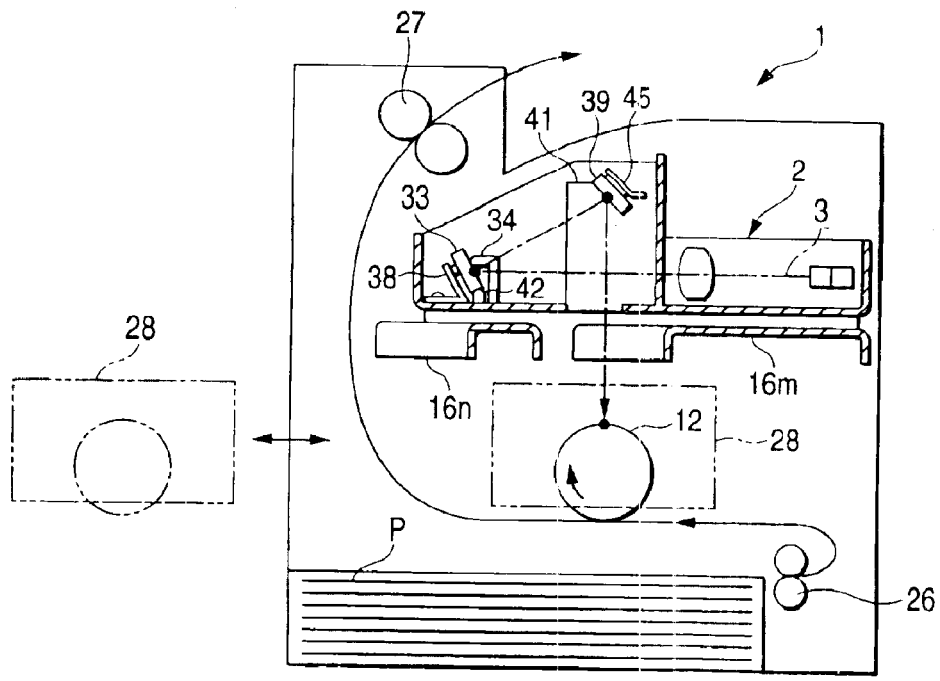
FIG. 31B is a partially sectional view showing the rough structure of the electrophotographic apparatus of the third embodiment when viewed laterally.
Figure 32A:
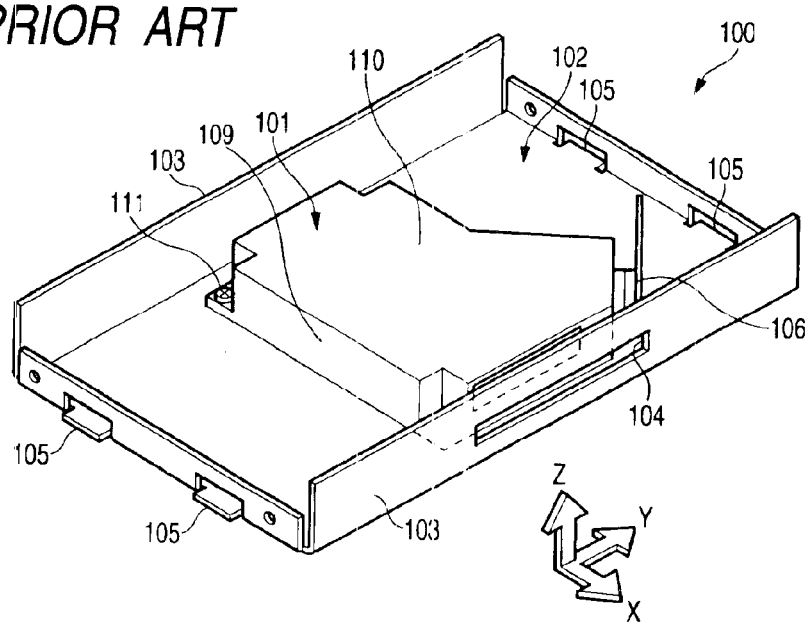
FIG. 32A is a perspective view of the main part of a conventional electrophotographic apparatus.
Figure 32B:
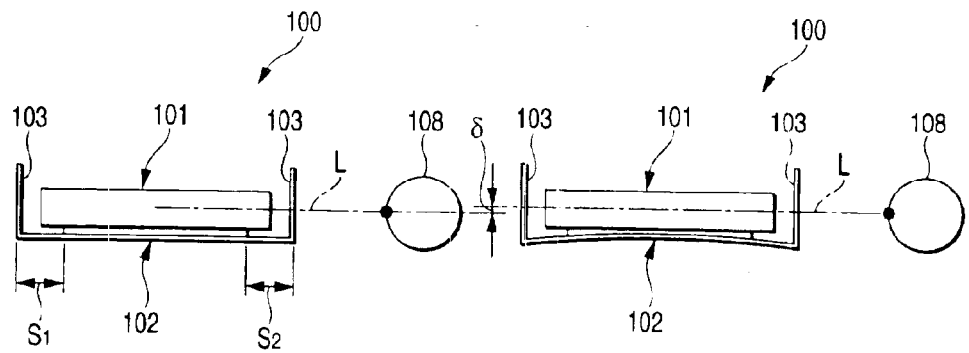
FIG. 32B is a view of FIG. 32A viewed in a Y direction.
Figure 33A:
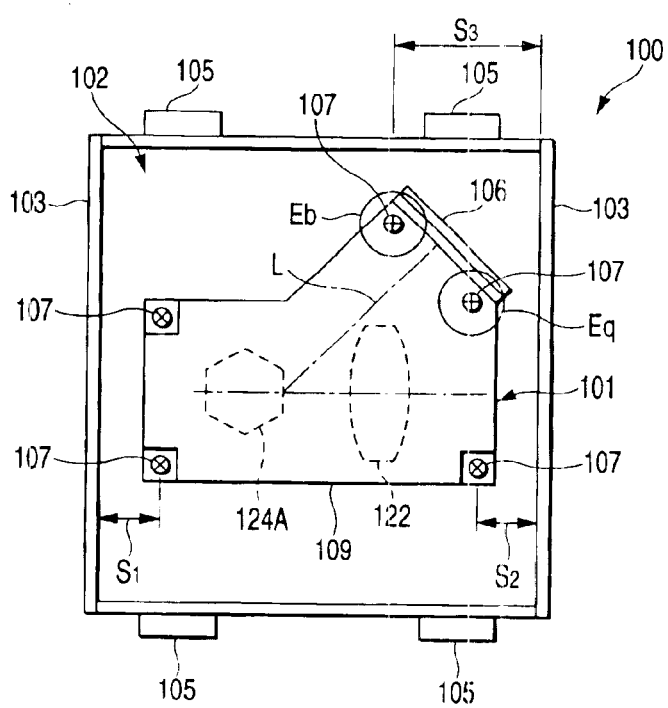
FIGS. 33A and 33B are views for explaining problems of the conventional electrophotographic apparatus shown in FIGS. 32A and 32B.
Figure 33B:
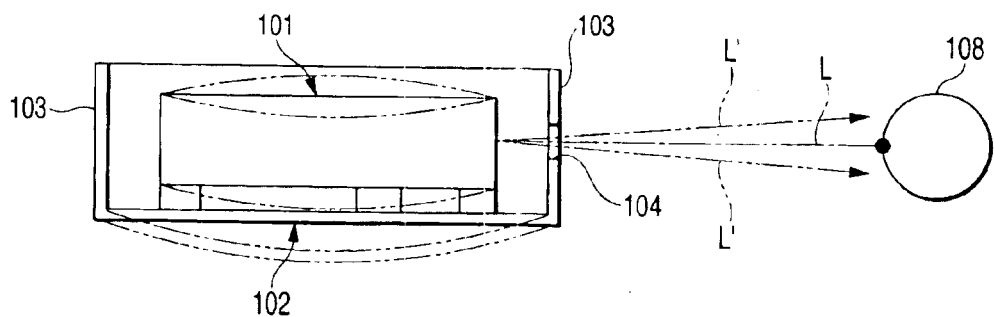
Figure 34A:
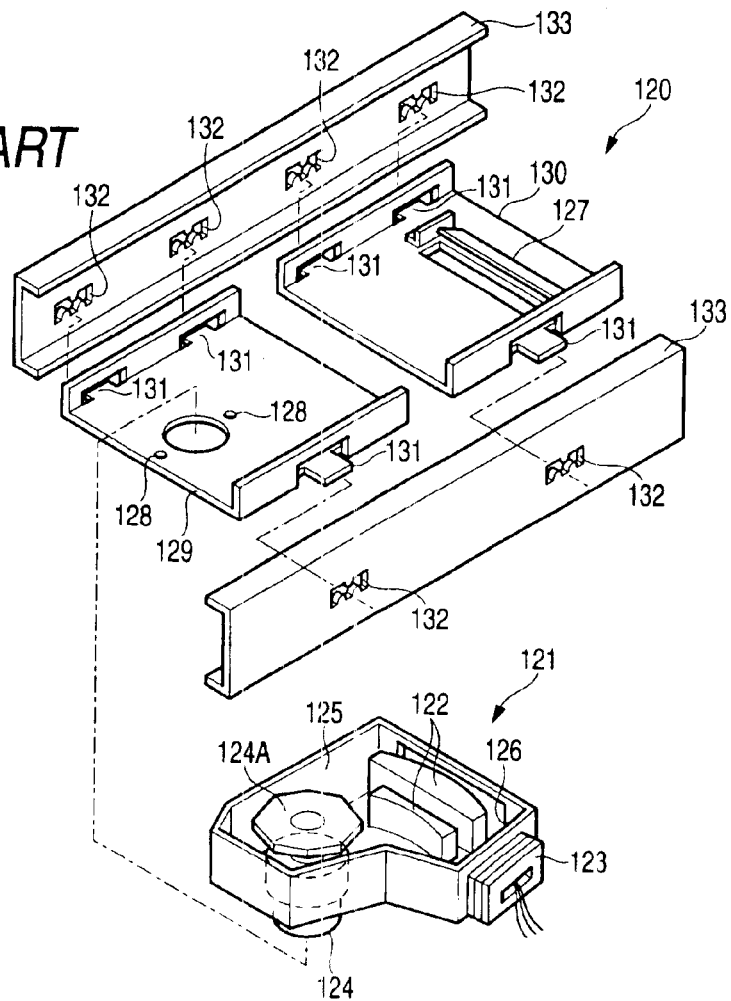
FIG. 34A is an exploded perspective view of the main part of another conventional electrophotographic apparatus.
Figure 34B:
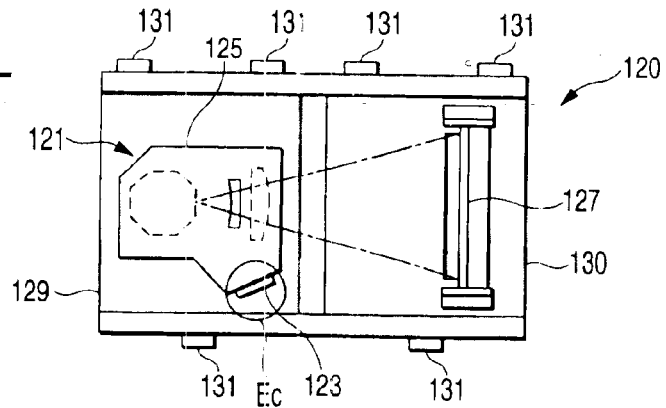
FIG. 34B is a plan view of the main part of the another conventional electrophotographic apparatus.
Figure 34C:
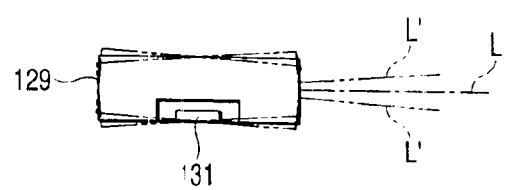
FIG. 34C is a side view at the time of vibration of an optical scanning device mount frame.
Figure 35A:
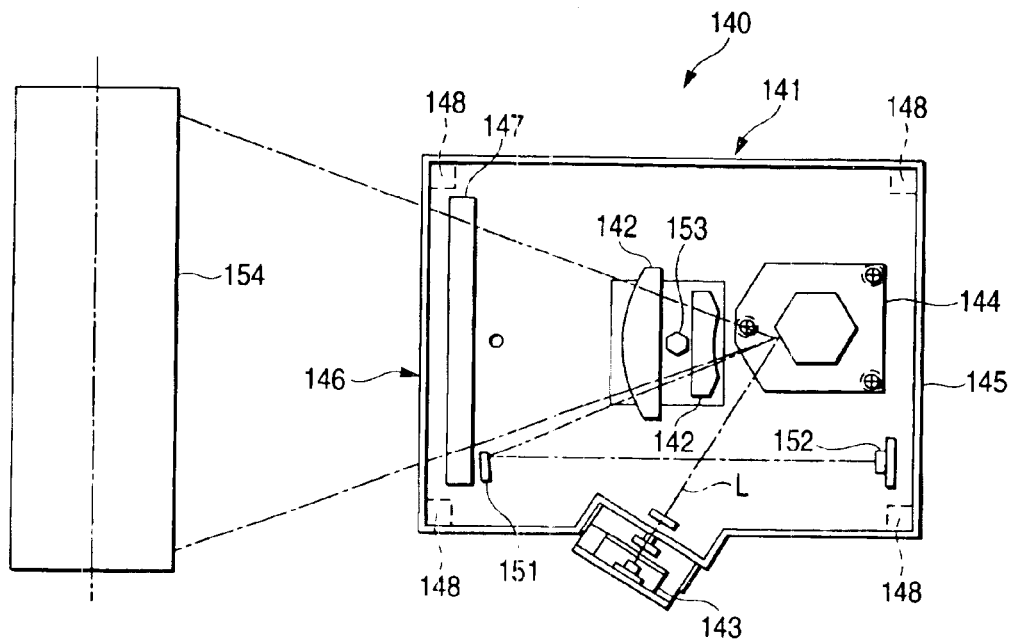
FIG. 35A is a plan view of the main part of still another conventional electrophotographic apparatus.
Figure 35B:
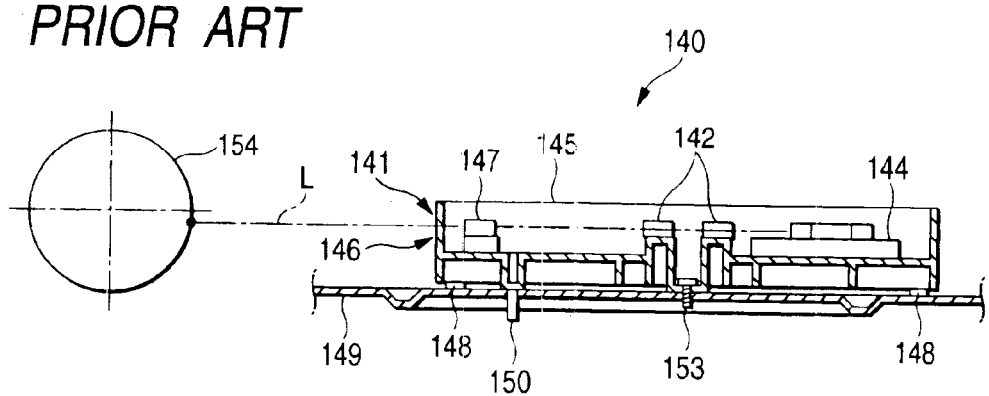
FIG. 35B is a longitudinal sectional view of FIG. 35A.
Figure 36A:
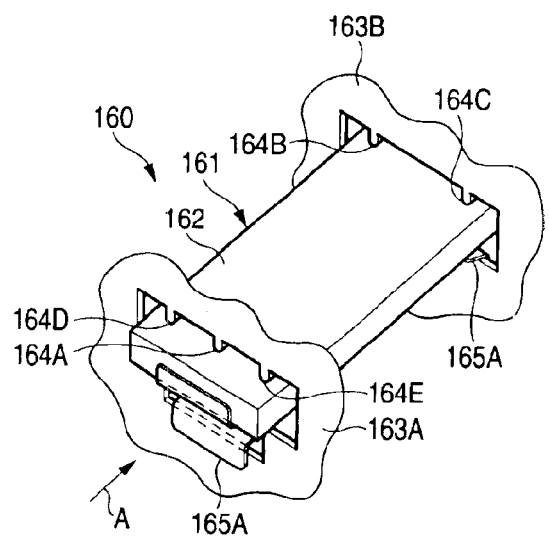
Figure 36B:
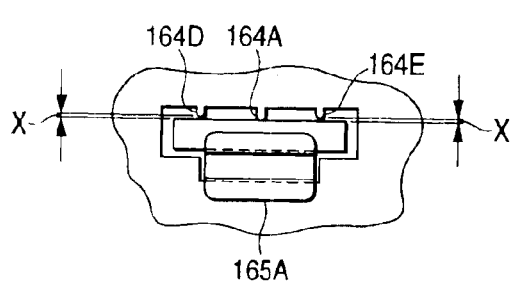
Figure 36C:
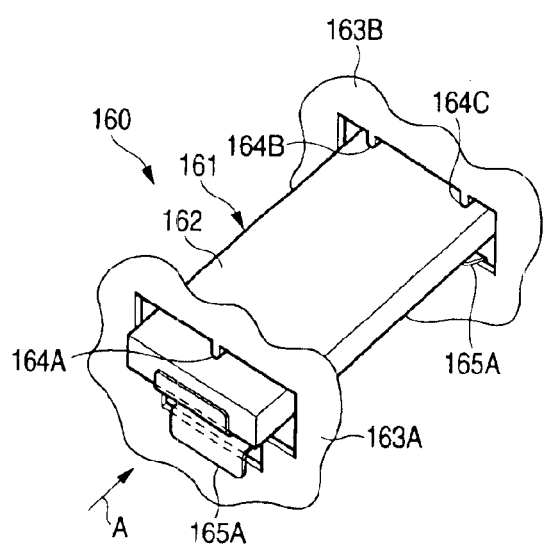
Figure 36D:
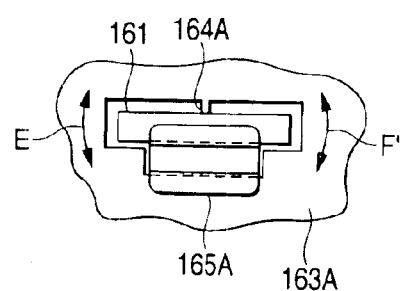

Next, a third embodiment of the invention will be described with reference to FIGS. 31A and 31B. Incidentally, the same structures as the foregoing embodiments are denoted by the same reference characters, and the description will be omitted.

In this embodiment, an optical scanning device 2 is supported by an optical scanning device mount frame 16*n* and an optical scanning device mount frame 16*m*.

The optical scanning device mount frame 16*n* is attached to a first frame 13 and a second frame 14 through a stay 43 and a stay 44.

Besides, the optical scanning device 2 of this embodiment includes a second reflecting mirror 39 in addition to a reflecting mirror 33 for guiding a light beam to a body 12 to be scanned.

The second reflecting mirror 39 is pressed and fixed to one not-shown point of a third support part 40 provided in an optical box 8 and two not-shown points of a fourth support part 41, that is, three points in total by elastic bodies 45.

An angle is determined by pulling out and adjusting an adjustment screw 37 (not shown in FIG. 31) attached to an adjustment member 36 so that the light beam 3 is guided by the reflecting mirror 33 to a desired position of the body 12 to be scanned, and the light beam 3 passes through a window part 7 of an optical box 8 via the second reflecting mirror 39, and then, passes through a space between the optical scanning device mount frame 16*n* and the optical scanning device mount frame 16*m* and is guided to the body 12 to be scanned.

Since the third support part 40 for supporting the second reflecting mirror 39 at the one point is placed on the side of the short side where the deformation at the time of vibration of the optical scanning device mount frames 16*m* and 16*n* is small, similarly to the foregoing embodiments, the improvement of image quality can be achieved.

Besides, contrary to the conventional apparatus, since it becomes unnecessary to apply an adhesive to the one-point support side, the manufacturing cost can be suppressed.

As described above, the present invention has excellent effects that the miniaturization of the electrophotographic apparatus and the improvement of image quality can be achieved.

The entire disclosure of Japanese Patent Application No. 2003-078968 filed on Mar. 20, 2003 including specification, claims, drawings and abstract is incorporated herein by reference in its entirety.

What is claimed is:

1. An electrophotographic apparatus comprising:

an optical scanning device comprising at least a light source for emitting a light beam, a polygon mirror for scanning with the light beam, a motor for rotating the polygon mirror, and an imaging optical system for imaging an image of the light beam on a body to be scanned, all of which are housed in an optical box;

an optical scanning device mount frame which mounts the optical scanning device; and at least one pair of side frames to which the optical scanning device mount frame is attached, wherein at least both ends of the optical scanning device mount frame connected with a center line thereof as a center are attached to the side frames, and a shape of the optical scanning device mount frame is asymmetrical with respect to the center line thereof.

2. The electrophotographic apparatus according to claim 1, wherein, at a time of vibration, a maximum deformation position on an optical scanning device mount plane of the optical scanning device mount frame is different from the frame center line.

3. The electrophotographic apparatus according to claim 1, wherein lengths of coupling parts of the optical scanning device mount frame connected with the respective side frames are different from each other, the optical box includes a plurality of fixing points for fixing itself to the optical scanning device mount frame, and the number of fixing points placed on a side of a short one of the coupling parts larger than the number of fixing points on a side of a long one of the coupling parts.

4. The electrophotographic apparatus according to claim 1, wherein, in the optical box, at least one fixing point is provided inside at least four other fixing points, and the inside fixing point is disposed on a side of a short side of the optical scanning device mount frame.

5. The electrophotographic apparatus according to claim 1, wherein a part or all of a driving device for driving at least the body to be scanned is placed inside the pair of side frames and in a vicinity of a coupling portion having a short coupling length among coupling portions between the side frames and the optical scanning device mount frame.

6. The electrophotographic apparatus according to claim 1, wherein the light source is placed on a side of a short side of the optical scanning device mount frame.

7. The electrophotographic apparatus according to claim 1, wherein a short side of the optical scanning device mount frame is disposed on a latent image forming starting side of the optical scanning device.

8. The electrophotographic apparatus according to claim 1, further comprising:

a reflecting mirror provided in the optical box for guiding the light beam to the body to be scanned;

a first support part provided in the optical box, disposed on a side of a short side of the optical scanning device mount frame, and coming in contact with one end of the reflecting mirror at one point;

a second support part disposed on a side of a long side of the optical scanning device mount frame and coming in contact with the other end of the reflecting mirror at two points; and a pressing unit which presses the reflecting mirror to the first support part and the second support part.

* * * * *